US006983882B2

(12) United States Patent  (10) Patent No.: US 6,983,882 B2
Cassone  (45) Date of Patent: Jan. 10, 2006

(54) PERSONAL BIOMETRIC AUTHENTICATION AND AUTHORIZATION DEVICE

(75) Inventor: Jean Cassone, Bangkok (TH)

(73) Assignee: Kepler, Ltd., Hong Kong (CN)

( * ) Notice: Subject to any disclaimer, the term of this patent is extended or adjusted under 35 U.S.C. 154(b) by 21 days.

(21) Appl. No.: 10/403,934

(22) Filed: Mar. 31, 2003

(65) Prior Publication Data

US 2004/0188519 A1    Sep. 30, 2004

(51) Int. Cl.
G06K 5/00    (2006.01)
(52) U.S. Cl. ............... 235/382; 235/375; 235/379; 235/380; 705/5; 705/26; 705/39; 705/44; 705/64; 705/79; 340/382.31; 439/65
(58) Field of Classification Search ............... 235/382, 235/380, 462.09, 379, 375; 705/5, 79, 39, 705/44, 26, 64; 382/124, 115; 340/825.31, 340/382.31; 439/65
See application file for complete search history.

(56) References Cited

U.S. PATENT DOCUMENTS

| 3,868,057 A | 2/1975 | Chavez |
| 4,529,870 A | 7/1985 | Chaum |
| 4,879,645 A | 11/1989 | Tamada et al. |
| 5,239,166 A | 8/1993 | Graves |
| 5,484,997 A | 1/1996 | Haynes |
| 5,530,232 A | 6/1996 | Taylor |
| 5,559,885 A * | 9/1996 | Drexler et al. ............... 235/380 |
| 5,578,808 A | 11/1996 | Taylor |
| 5,623,552 A * | 4/1997 | Lane ............................ 382/124 |
| 5,657,389 A * | 8/1997 | Houvener ..................... 713/186 |
| 5,680,205 A | 10/1997 | Borza |
| 5,770,849 A | 6/1998 | Novis et al. |
| 5,787,186 A | 7/1998 | Schroeder |
| 5,796,832 A | 8/1998 | Kawan |
| 5,907,149 A | 5/1999 | Marckini |
| 5,987,155 A * | 11/1999 | Dunn et al. .................. 382/116 |
| 6,012,039 A * | 1/2000 | Hoffman et al. ............... 705/14 |
| 6,012,636 A | 1/2000 | Smith |
| 6,182,892 B1 | 2/2001 | Angelo et al. |
| 6,193,152 B1 | 2/2001 | Fernando et al. |
| 6,213,391 B1 | 4/2001 | Lewis |
| 6,219,439 B1 | 4/2001 | Burger |
| 6,270,011 B1 | 8/2001 | Gottfried |

(Continued)

FOREIGN PATENT DOCUMENTS

DE    4231913 A1    1/1994

(Continued)

OTHER PUBLICATIONS

SAGEM Morphokit™, 2 pages, (Apr. 2001).

(Continued)

Primary Examiner—Jared J. Fureman
Assistant Examiner—Allyson N Trail
(74) Attorney, Agent, or Firm—Akin Gump Strauss Hauer & Feld, LLP

(57) ABSTRACT

A personal biometric authentication and authorization device (PAD) provides protection for portable tokens such as magnetic stripe cards and smart cards. The PAD enables portable tokens upon engagement with the PAD and comparison of a biometric input on the PAD with a stored biometric data. The PAD can be used for biometrically authenticated transactions with or without a portable token. Multiple user account data can be stored in the PAD. The PAD can write the magnetic stripe of a magnetic stripe portable token. The PAD can be enrolled with an enrollment system to associate the PAD, an individual, and the portable tokens to be used with the PAD. The PAD can be used for e-commerce transactions.

70 Claims, 14 Drawing Sheets

U.S. PATENT DOCUMENTS

| | | | |
|---|---|---|---|
| 6,293,462 B1 * | 9/2001 | Gangi | 235/380 |
| 6,325,285 B1 * | 12/2001 | Baratelli | 235/380 |
| 6,334,575 B1 | 1/2002 | Su-Hui | |
| 6,335,688 B1 | 1/2002 | Sweatte | |
| 6,422,462 B1 | 7/2002 | Cohen | |
| 6,424,249 B1 * | 7/2002 | Houvener | 340/5.82 |
| 6,454,173 B2 | 9/2002 | Graves | |
| 6,457,640 B2 | 10/2002 | Ramachandran et al. | |
| 6,464,146 B2 | 10/2002 | Ito et al. | |
| 6,505,772 B1 | 1/2003 | Mollett | |
| 6,631,201 B1 * | 10/2003 | Dickinson et al. | 382/124 |
| 6,698,654 B1 * | 3/2004 | Zuppicich | 235/380 |
| 2001/0000405 A1 | 4/2001 | Gray et al. | |
| 2001/0045458 A1 * | 11/2001 | Polansky | 235/382 |
| 2001/0053239 A1 | 12/2001 | Takhar | |
| 2002/0017558 A1 | 2/2002 | Graves | |
| 2002/0025062 A1 * | 2/2002 | Black | 382/116 |
| 2002/0060243 A1 | 5/2002 | Janiak et al. | |
| 2002/0073315 A1 | 6/2002 | Candelore | |
| 2002/0095389 A1 | 7/2002 | Gaines | |
| 2002/0123972 A1 | 9/2002 | Hodgson et al. | |
| 2002/0128980 A1 | 9/2002 | Ludtke et al. | |
| 2002/0130187 A1 | 9/2002 | Berg et al. | |
| 2002/0138438 A1 * | 9/2002 | Bardwell | 705/51 |
| 2002/0148892 A1 | 10/2002 | Bardwell | |
| 2002/0150282 A1 * | 10/2002 | Kinsella | 382/124 |
| 2002/0153424 A1 * | 10/2002 | Li | 235/492 |
| 2002/0158747 A1 | 10/2002 | McGregor et al. | |
| 2002/0164057 A1 | 11/2002 | Kramer | |
| 2002/0166891 A1 * | 11/2002 | Stoutenburg et al. | 235/379 |
| 2002/0178124 A1 | 11/2002 | Lewis | |
| 2002/0180584 A1 | 12/2002 | McGregor et al. | |
| 2003/0028481 A1 * | 2/2003 | Flitcroft et al. | 705/39 |
| 2003/0031321 A1 | 2/2003 | Mages | |
| 2003/0046249 A1 * | 3/2003 | Wu | 705/79 |
| 2003/0083954 A1 * | 5/2003 | Namba | 705/26 |
| 2003/0093385 A1 * | 5/2003 | Vallee et al. | 705/64 |
| 2003/0116621 A1 * | 6/2003 | Duncan | 235/379 |
| 2003/0116630 A1 * | 6/2003 | Carey et al. | 235/462.09 |
| 2003/0218065 A1 * | 11/2003 | Viswanathan | 235/449 |
| 2004/0029409 A1 * | 2/2004 | Moon et al. | 439/65 |
| 2004/0199469 A1 * | 10/2004 | Barillova et al. | 705/44 |

FOREIGN PATENT DOCUMENTS

| | | |
|---|---|---|
| EP | 0945821 A2 | 9/1999 |
| EP | 1085424 A1 | 3/2001 |
| EP | 1120755 A1 | 8/2001 |
| JP | 63053687 A | 3/1988 |
| JP | 01152590 A | 6/1989 |
| JP | 01236388 A | 9/1989 |
| JP | 02118790 A | 5/1990 |
| JP | 02259891 A | 10/1990 |
| JP | 02271466 A | 11/1990 |
| JP | 06076127 A | 3/1994 |
| WO | WO94/17498 * | 8/1994 |

OTHER PUBLICATIONS

SAGEM Morphomodule™, 2 pages, (Apr. 2001).
SAGEM Morphoaccess™, 2 pages, (Apr. 2001).
SAGEM Morphotouch™, 2 pages, (Apr. 2001).
SAGEM Morphop@ck™, 2 pages, (Apr. 2001).
STMicroelectronics, "Securing the Information Age," 2 pages, (Oct. 2002).
Stefan Brands, "Off-Line Cash Transfer by Smart Cards," Centrum voor Wiskunde en Informatica Report CS-R9455, 17 pages, (Sep. 26, 1994).
VASCO Data Security, Inc., "VASCO DIGIPASS® Family of Tokens Concepts Technical Whitepaper," 9 pages, undated.
VASCO Data Security, Inc., "DIGIPASS® PRO 800," 2 pages (Jan. 4, 2002).
VASCO Data Security, Inc., "DIGIPASS® GO 2," 2 pages (Oct. 25, 2002).
VASCO Data Security, Inc., "DIGIPASS® DESK 300," 2 pages, (Jan. 4, 2002).
©VASCO, "Product Range," 4 pages, (2003).
XIRING®, XSign, 2 pages, undated.
XIRING®, XIRING Security Offer, 4 pages, (Feb. 2001).
XIRING®, XPad, 2 pages, (May 2001).
RSA Security, Inc., RSA SecurID® Authenticators, 2 pages, undated.
Brian Fonseca, "Smart Cards Poised for Wider Adoption—Vendors Are Pushing Network—Access and Multifunction Features to Broaden Appeal," InfoWorld, v22-i43, 3 pages, (Oct. 23, 2000).
"SchlumbergerSema and Precise Biometrics Integrate Smart Card Authentication Technology; SchlumbergerSema Meets Customer Demand and Takes Lead in Biometric-enabled Smart Cards Through Integration of Prcise Biometrics Fingerprint Technology," PrimeZone Media Network, 4 pages, (Feb. 19, 2002).
KEYWARE, Keyware SMART-Shopper, 4 pages, (2001).
KEYWARE Keyware CAS™ Server, 6 pages, (2001).
KEYWARE, Keyware CAS SignOn™, 6 pages, (2001), no month available.
KEYWARE, Keyware —Identifying The World, http://www.keyware.com/products/default.asp?id=7, 1 page, (2002), no month available.
"bCheck(SM) Delivers Convenient Biometric Payments to Consumers; Merchants Get Low-Cost, Secure Payments; Santoni's Supermarket to Install First bCheck(SM) Application," PR Newswire, 3pages, (Feb. 18, 2003).
"Credit Card Limits Extended to 5GB," Medialine, 2 pages, (Feb. 1, 2003).
Jeffrey Kutler, "Smart Cards Getting More Than Token Support," American Banker, v162-n20, 4 pages, (Jan. 30, 1997).
"Datacard Brings Security and Productivity to the Forefront With New Version of Industry-leading Identification Software," Canadian Corporate News, 2 pages, (Jan. 14, 2003).
Chris Jones, "Dealing Out Smart Cards," InfoWorld, v19-n10, 4 pages, (Mar. 10, 1997).
Stephen Cobb, "Smartcard Invasion Continues," Byte, v23-n4, 4 pages, (Apr. 1998).
Dan Balaban, "Should Smart Cards Carry Their Own Biometric Sensors?," Card Technology, v2-i11, 6 pages, (Nov. 2001).
"Business Talk Radio Features Hunno Technologies Inc.," PrimeZone Media Network, 2 pages, (Jan. 16, 2003).
"Fingerprint Cards' Portable, Power-Efficient Embedded Biometric Solutions Now Available for TI DSP's; Fingerprint Cards Joins TI's Third Party Network," PR Newswire, 2 pages, (Feb. 24, 2003).
"LISCR Unveils World's First Biometic Seafarer's Identity Card; Uses Datastrap's 2D Bar Code Technology to Prevent Identity Fraud; Will Affect 500,000 Seafarers Around the Globe," PR Newswire, 3 pages, (Feb. 26, 2003).
"National Semiconductor Backs Validity Biometri . . . ," Australian Business Intelligence, 2 pages, (Mar. 4, 2003).
"SAFLIK CORP—SAFaccess™ Biometric Security Solution Certified ca smart™—With Computer Associates' eTrust™ Single Sign-On," Market News Publishing, 3 pages, (Jun. 6, 2002).

"Beijing: Biometrics Fingerprint Card Coming.," *Alestron*, 2 pages, (Mar. 6, 2003).

Ziff Davis Media, Inc., "HP Touts PC Group's Innovation.," *eWeek*, 2 pages, (Feb. 28, 2003).

Alan Leibert, "Smart Cards—A 20th Century Product for the 21st Century Player," *Customer Relationship Management*, 4 pages, (Mar./Apr. 2000).

"At New York Retailer Expo, High Tech Moves Onto Store Shelf," *Tribune Business News*, 4 pages, (Jan. 20, 2003).

K. M. Martin, et al., "Secure Billing for Mobile Information Services in UTMS," 13 pages, undated.

J. F. Dhem, et al., "SCALPS: Smart Card Applied to Little Payment Systems," UCL Crypto Group Technical Report Series, *IEEE Micro Magazine*, 20 pages, (Jun. 1996).

Oliver Delos, et al., "An Identity-Based Signature Scheme with Bounded Life-Span," 12 pages, undated, no date available.

Luca Bechelli, et al., "Biometrics Authentication with Smartcard," Istituto di Informamatica e Teleomatica (ITT), http:///www.iat.cnr.it/attivita/progetti/parametri_biomedici.html, 12 pages, (Aug. 2002).

"Thinkpulse to Showcase Smartx Smart Card Solution One," *ScreamingMedia, Business Wire*, 2 pages, (Jun. 6, 2000).

GEMPLUS, "The world's leading provider of smart card solutions," website www.gemplus.com, 1 page, printed Mar. 11, 2003, undated.

"Firms Cooperate on Smart Card-Biometric Partnership," *SDM Insider*, 1 page, (Jul. 2002).

"Biometric, Smart Card Combo," *SDM Insider*, 1 page, (Sep. 2002).

"It's Biometric Hat-Trick," *Design Engineering*, 1 page, (Jan. 2003).

"Schlumberger Announces Biometric Smart Card Application," *Cardine*, 1 page, (Feb. 22, 2002).

"Sagem and Gemplus Work Together to Produce Biometric and Smart Card Technology," *Telecomworldwire*, 1 page, (Feb. 5, 2003).

"Card Technology Calendar," *Card Technology*, 2 pages, (Aug. 2001).

\* cited by examiner

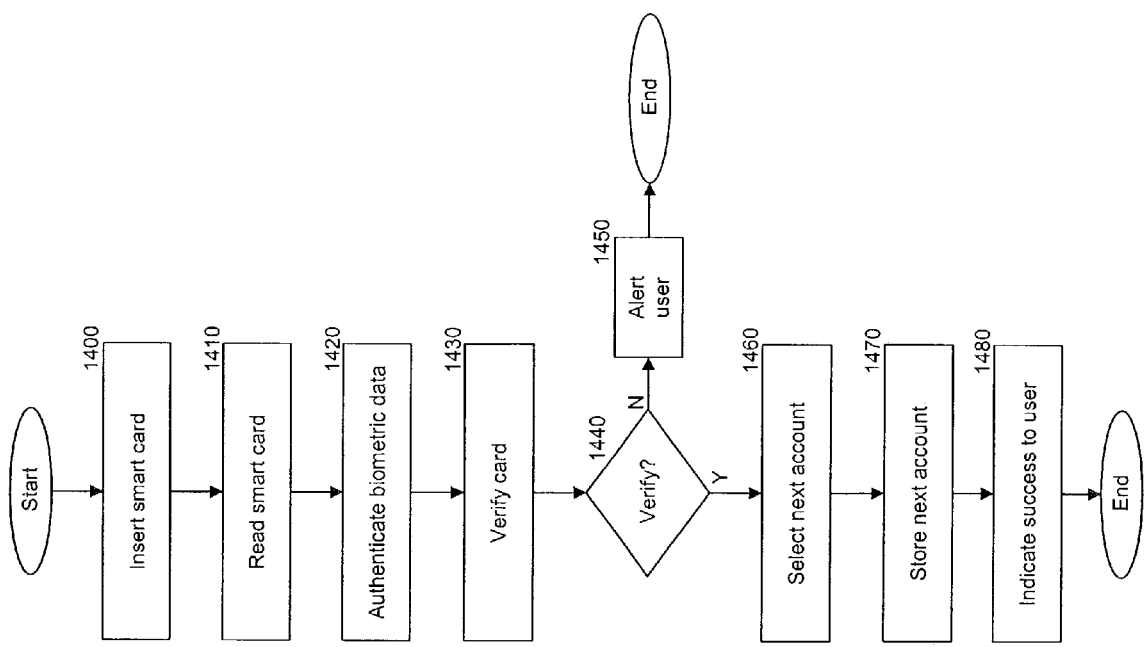

PERSONAL BIOMETRIC AUTHENTICATION AND AUTHORIZATION DEVICE

BACKGROUND OF THE INVENTION

1. Field of the Invention

The present invention relates to a system for biometrically authenticating the user of a portable token.

2. Description of the Related Art

Banking cards with a magnetic stripe are presently only protected by a four digit Personal Identification Number (PIN) code known to the bearer of the banking card. The fraud associated with theft, deception and forgery substantially increases every year and current estimates exceed 2%, although official figures are not made available. The Wall Street Journal reported a study by Gartner Inc. that claims that the fraud rate reached 1.8% for e-commerce alone in the United States in the last three years, totaling $1.6 billion. Card issuers typically protect card holders against fraud, although in some cases card holders must pay a small premium for the protection. Card issuers typically insure against their own losses. In France, the use of smart cards has significantly reduced (by a factor larger than 10) the potential for fraud. Usage of smart cards is extending throughout Europe; however, the United States has not yet decided to adopt the French smart card technology due to the cost (estimated at $12 billion) associated with the required changes in the infrastructure of the various Automatic Teller Machine (ATM), Point Of Sale (POS) networks, and other card-processing networks. Further, smart cards can have their own security weaknesses.

BRIEF SUMMARY OF THE INVENTION

Various embodiments implementing aspects of the invention are disclosed, generally directed to an authorization device employing biometric input. One embodiment is a personal authorization device for authorizing portable tokens for transactions, comprising a biometric sensor adapted to receive a biometric input, a biometric data storage adapted to hold stored biometric data to be compared with the biometric input, and a magnetic stripe writer, adapted to write valid magnetic stripe data to a magnetic stripe of a portable token responsive to the biometric input corresponding to the stored biometric data. The personal authorization device may store a plurality of account data which may be selectively written to the magnetic stripe. The personal authorization device may be enrolled with an enrollment system, which may transmit account data to the personal authorization device.

In another embodiment, an integrated personal authorization device comprises a biometric sensor adapted to receive a biometric input, a biometric data storage adapted to hold stored biometric data to be compared with the biometric input, and an account information storage adapted to hold user account information for a user account that corresponds to the stored biometric data, and an interface for authorizing transactions with an external system responsive to the biometric input corresponding to the stored biometric data. The integrated personal authorization device may be enrolled with an enrollment system via the interface, receiving account information from the enrollment system. The integrated personal authorization device may comprise an internal server, which may interact with a transaction authorization system to validate the transaction with the external system.

In another embodiment, a technique for enrolling a personal authorization device comprises opening communications between the personal authorization device and an enrollment system, authenticating the personal authorization device to the enrollment system, obtaining biometric data on the personal authorization device from a user, storing the biometric data on the personal authorization device, and closing communications with the enrollment system. The technique may send a plurality of user account data to the personal authorization device, storing the plurality of user account data in the personal authorization device.

In yet another embodiment, a biometric protection system comprises a smart card and a personal authorization device. The smart card stores a master account data and an application for providing an additional account data to the personal authorization device if a biometric input received by a biometric sensor of the personal authorization device corresponds to a stored biometric data on the personal authorization device. The personal authorization device has an interface for communication with the Smart Card. The biometric protection system may further include an enrollment system for enrolling the personal authorization device upon validation of the personal authorization device by the enrollment system, where the enrollment system may provide an additional user account data for storing on the smart card by the personal authorization device.

In yet another embodiment, a technique uses a personal authorization device for e-commerce transactions. After authenticating a user by comparing a stored biometric data on the personal authorization device to a biometric input sensed by the personal authorization device, user account data from a portable token engaged with the personal authorization device may be provided via the personal authorization device to a transaction system. The personal authorization device may also communicate with a transaction authorization system to validate the personal authorization device and the user account data with the transaction authorization system, transmitting validation information to the transaction system via the personal authorization device.

Various other aspects of the invention are described and claimed below.

BRIEF DESCRIPTION OF THE SEVERAL VIEWS OF THE DRAWINGS

A better understanding can be obtained when the following detailed description of several disclosed embodiments is considered in conjunction with the following drawings in which

FIG. 14 is a flowchart illustrating a technique for using a PAD with a smart card.

DETAILED DESCRIPTION OF THE INVENTION

Figure 1:
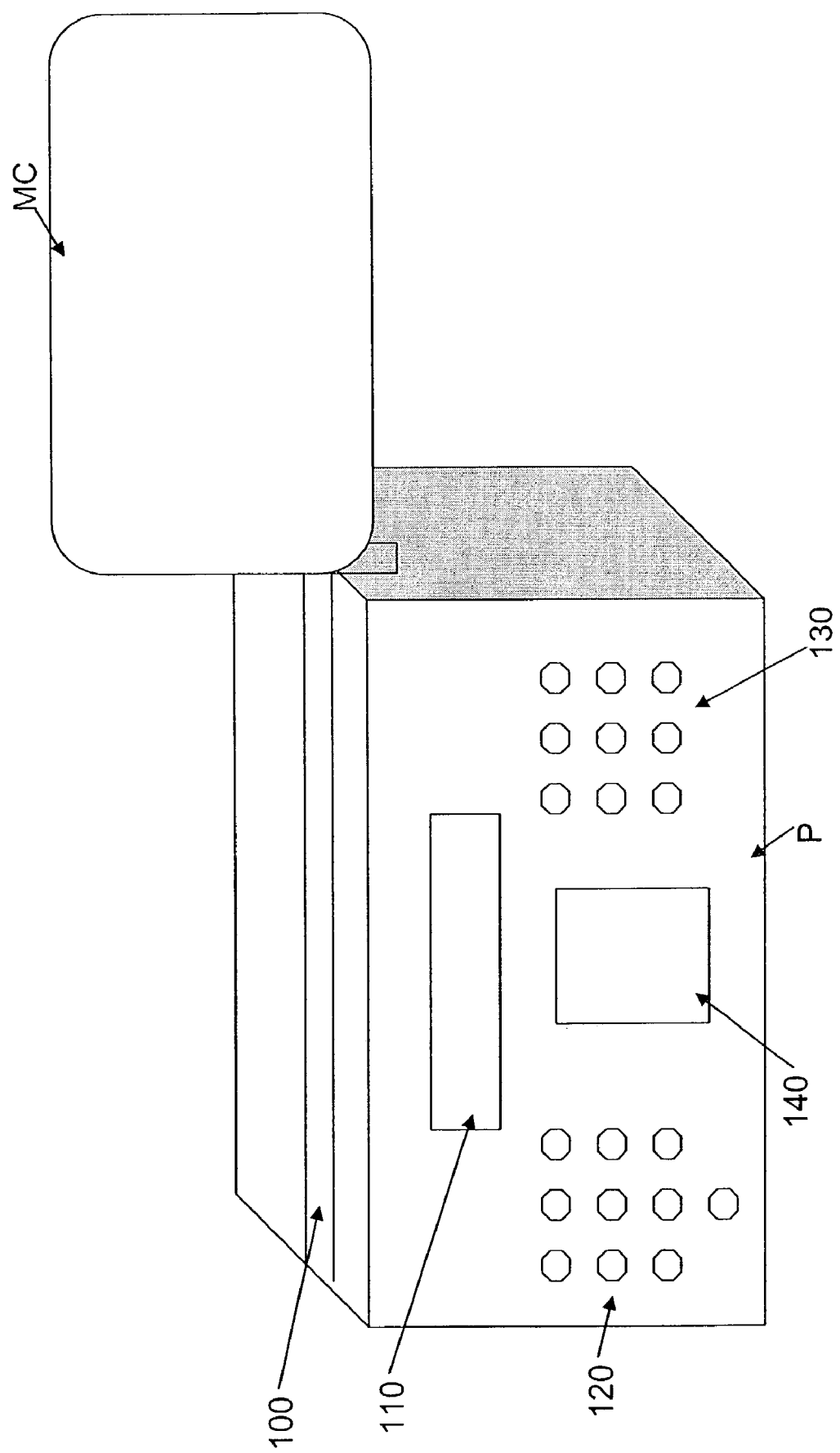
FIG. 1 is a view of an illustrative embodiment of a personal authorization device (PAD)

A personal authorization device can provide protection for portable tokens like magnetic stripe cards, such as credit or debit cards, with a biometric authentication technique, while preserving the privacy of the biometric data, without providing the biometric data to remote systems. FIG. 1 illustrates a personal authorization device PAD P for use with a magnetic stripe card MC according to one embodiment. The magnetic stripe card MC is typically generally rectangular with rounded corners, although other shapes are used, such as the DISCOVER® 2GO abstract rounded shape card.

Figure 8:
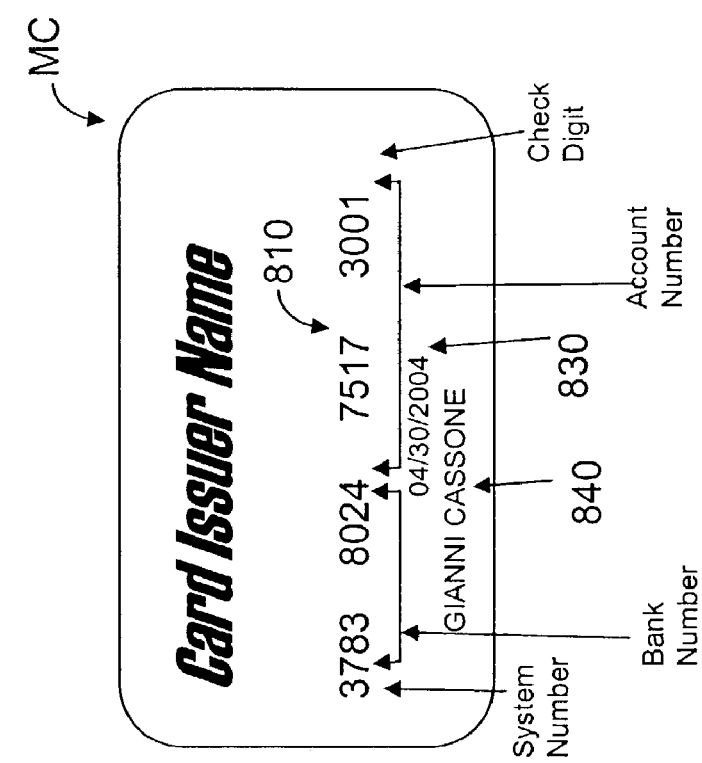
FIG. 8 is a drawing of a typical magnetic stripe credit card.
Figure 8:
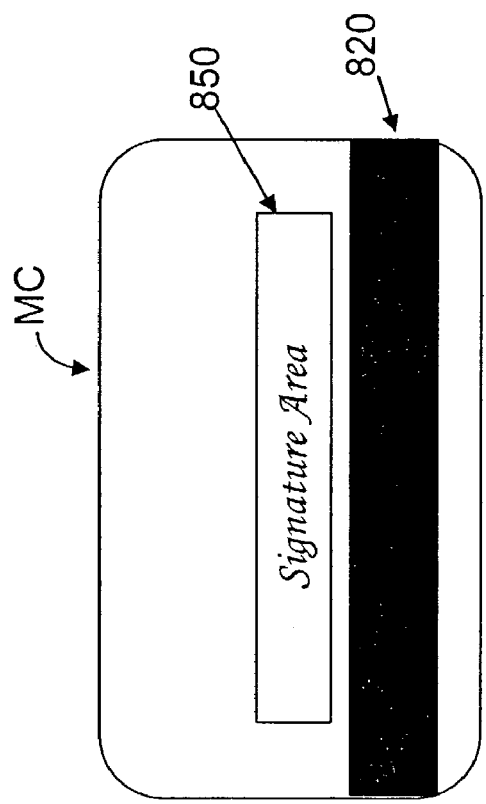

The card MC typically has a thickness of roughly 0.76 mm (0.030 inches), but other thicknesses may be used. On one of its major sides, an area is reserved for a magnetic stripe, as is best shown in FIG. 8, where magnetic stripe 820 is shown on the backside of card MC. Many cards MC include embossed information on the front side of the card, such as the account number 810, validity dates 830, and cardholder name 840, as illustrated in FIG. 8. The arrangement of these optional elements is illustrative and exemplary only and other arrangements and embossed information can be used. Further, magnetic stripe cards can be used without any embossed information. A signature area is frequently found on the backside of the card, such as the area 850 shown in FIG. 8, for additional security. However, cardholders routinely forget to sign the cards and signatures are infrequently checked in common transactions where the card is physically presented, and cannot be checked in e-commerce transactions. Some cards are produced with a picture of the cardholder. Again, the picture may not be checked in common transactions where the card is physically presented, and the picture cannot be checked in e-commerce transactions.

Multiple standards exist for magnetic stripe cards and the account numbers associated with those cards. Although magstripe cards originally were only credit cards, today debit cards, telephone calling cards, access control cards, and other kinds of cards may use magstripes. References to "credit cards" in the following should be taken as including all types of magstripe cards unless otherwise noted.

ANSI Standard X4.13-1983 is the system used by most national credit-card systems. The first digit in a credit-card account number under that standard signifies the issuing system:

3—travel/entertainment cards (such as American Express and Diners Club)
4—Visa
5—MasterCard
6—Discover Card The structure of the account number varies by system. For example, American Express card numbers typically start with 37; Carte Blanche and Diners Club with 38. For American Express cards, digits three and four are typically type and currency, digits five through 11 the internal account number, digits 12 through 14 the card number within the account, and digit 15 is typically a check digit. For VISA® account numbers, digits two through six are typically an issuer bank number, digits seven through 12 or seven through 15 the internal account number, and digit 13 or 16 is typically a check digit.

For MasterCard account numbers, digits two and three, two through four, two through five, or two through six are typically the bank number (depending on whether digit two is a 1, 2, 3 or other). The digits after the bank number up through digit 15 are typically the internal account number, and digit 16 is typically a check digit. However, other account number types and formats may be used.

The magnetic stripe, often referred to as a magstripe, is typically made up of tiny iron-based magnetic particles in a plastic-like film. Each particle is really a tiny bar magnet, typically about 20-millionths of an inch long.

The magstripe can be "written" because the tiny bar magnets can be magnetized in either a north or south pole direction. There are three tracks on the typical magstripe. Each track is typically about one-tenth of an inch wide.

The ISO/IEC standard 7811, which is used by many banks, specifies that track one is 210 bits per inch (bpi), and holds 79 6-bit plus parity bit read-only characters. Track two is 75 bpi, and holds 40 4-bit plus parity bit characters. Track three is 210 bpi, and holds 107 4-bit plus parity bit characters. Credit card typically uses only tracks one and two. Track three is a read/write track which typically includes an encrypted personal identification number (PIN) code, typically four digits, a country code, currency units and the amount authorized. Usage is not standardized among banks. Other numbers and arrangements of tracks may be used. Although any convenient format for the magstripe can be used, the information on track one is typically contained in two formats: A, which is reserved for proprietary use of the card issuer, and B, which includes the following:

| | |
|---|---|
| Start sentinel | one character |
| Format code = "B" | one character (alpha only) |
| Primary account number | up to 19 characters |
| Separator | one character |
| Country code | three characters |
| Name | two to 26 characters |
| Separator | one character |
| Expiration date or separator | four characters or one character |
| Discretionary data | enough characters to fill out maximum record length (79 characters total) |
| End sentinel | one character Longitudinal redundancy check (LRC) - one character |

The format for track two, developed by the banking industry, is typically as follows:

| | |
|---|---|
| Start sentinel | one character |
| Primary account number | up to 19 characters |
| Separator | one character |
| Country code | three characters |
| Expiration date or separator | four characters or one character |
| Discretionary data | enough characters to fill out maximum record length (40 characters total) |
| LRC | one character |

For authentication, there are three common basic methods for determining whether a credit card will be accepted for a given transaction. Merchants with few transactions each month may do voice authentication using a telephone. Electronic data capture (EDC) magstripe card swipe terminals may be used. E-commerce transactions on the Internet or elsewhere may use on-line authentication.

In a typical authorization scenario, after the bearer or the cashier swipes the credit card through a reader, the EDC software at the point-of-sale (POS) terminal dials a stored telephone number via a modem to call an acquirer. An acquirer is typically an organization that collects credit-authentication requests from merchants and provides the merchants with a payment guarantee. When the acquirer company gets the credit-card authentication request, it typically checks the transaction for validity and the recorded data on the magstripe for: Merchant ID, Valid card number, Expiration date, and Credit limit. Single dial-up transactions are typically processed at 1,200 to 2,400 bits per second (bps), while direct Internet attachment may use much higher speeds via this protocol. In this system, the cardholder may enter a personal identification number (PIN), typically four digits, using a keypad or other similar input device, although many transactions are done without use of the PIN. For example, before getting cash from an ATM, the ATM typically encrypts the PIN entered and sends it to a remote database to see if there is a match.

The PIN may be stored either in the bank's computers in an encrypted form or encrypted on the card itself. A one-way encryption technique is typically used. This means that computing a cipher given the bank's key and the customer's PIN is easy, but obtaining the plain-text PIN from the cipher, even if the key is known, is not computationally feasible. This feature was designed to protect the cardholder from being impersonated by someone who has access to the bank's computer files.

Likewise, the communications between the ATM and the bank's central computer are typically encrypted to prevent would-be thieves from tapping into the phone lines, recording the signals sent to the ATM to authorize the dispensing of cash, and then feeding the same signals to the ATM to trick it into unauthorized dispensing of cash.

Figure 3:
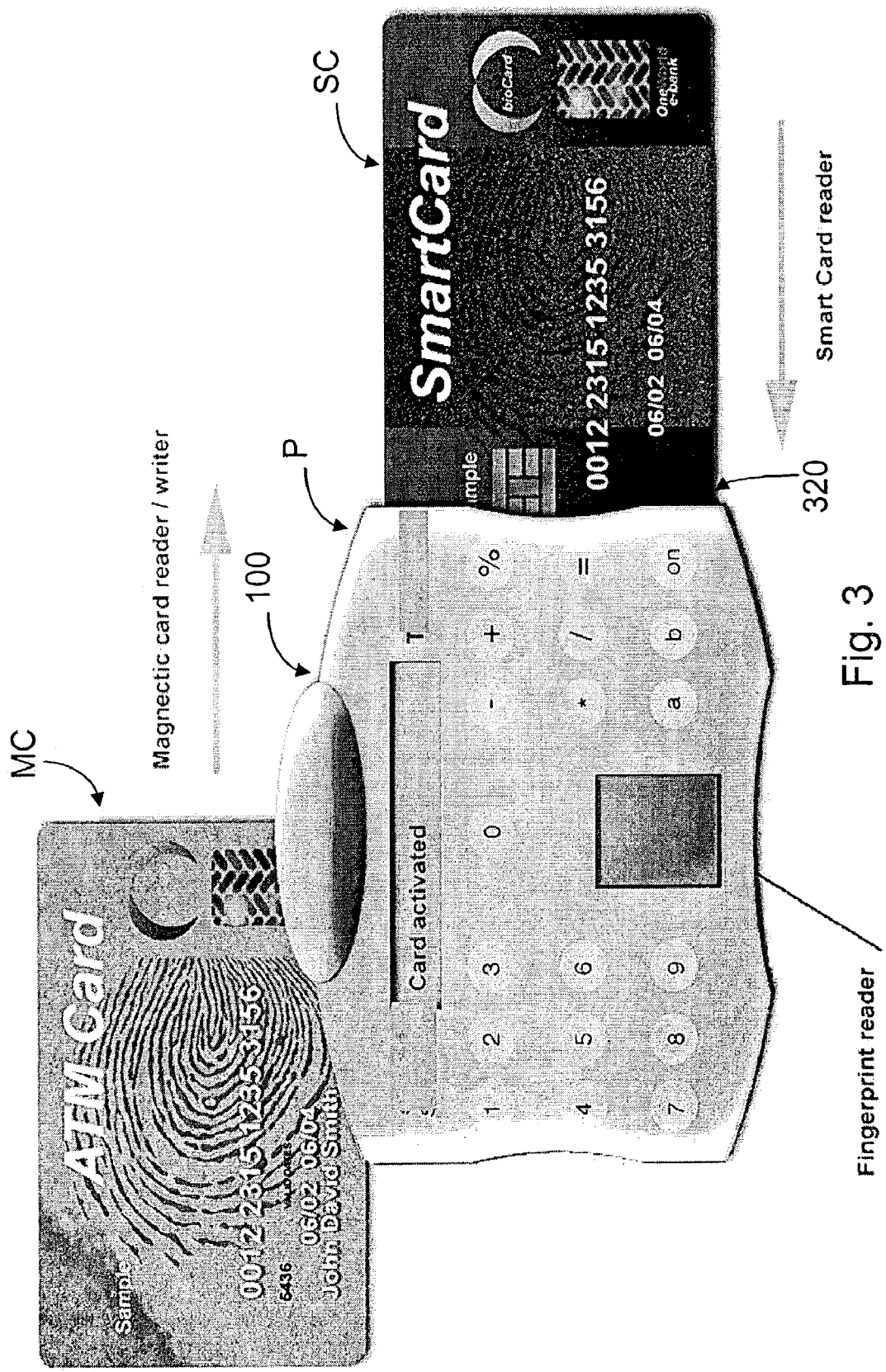
FIG. 3 is a view of another illustrative embodiment of a PAD showing engagement by a magnetic stripe card and a smart card.

The PAD P typically has the dimensions and appearance of a pocket calculator. However, the illustrated size and shape is exemplary only, and other dimensions and appearances may be used. As shown in FIG. 1, the PAD P includes a slit or slot 100 for the insertion of the card MC, presented here on one of the PAD P's sides. Alternately, the cards may be at least partially inserted into an opening on one side of the PAD P, as shown in FIG. 3, where a card SC is partially inserted into the PAD P. Other techniques for engaging the card MC with the PAD P may be used. In one embodiment, the PAD can be used both with magnetic stripe cards MC as well as smart cards, as illustrated by FIG. 3. On an upper side, PAD P may display data for a user on a display screen 110, which is preferably a liquid crystal type display, although other display types can be used. In one embodiment, the display 110 may be a 1-line display. Other sizes of displays may be used. A data entry feature 120 may also be provided. As shown in FIG. 1, the data entry feature is a keypad area, similar to those of a basic calculator including the 10 digits from 0 to 9. The PAD P may also include a keypad 130 with the period, the four basic operators for addition, subtraction, multiplication and division, and the equal sign, as well as enabling the calculation of percentages, memory keypads and operators for addition and subtraction within the memory. Other keys or types of data entry features or arrangements of features may be used. The PAD P may be switched on with the authentication of the bearer, with the removal of the card MC switching off the PAD P. An on switch and/or an off switch may also be used.

The PAD P may also include a biometric sensor 140, such as a fingerprint sensor. Although the following will be described in terms of fingerprint biometric sensors and data, other forms of biometric sensors and data may be used, and references to fingerprints and fingerprint sensors should be understood to apply to other kinds of biometric sensors and data, such as a microphone fitted to record the voice of the bearer in order to perform a voice recognition, a retina scan, or other kinds of biometric sensors. The features and arrangement of features of the PAD P as shown in FIG. 1 is illustrative and exemplary only, and other features and arrangements may be used. In one embodiment, the biometric sensor 140 may be a CMOS dactyloscopic scanner designed for 1:1 fingerprint authentication. The TCEBA TOUCHCHIP® Fingerprint Biometric Subsystem from the STMicroelectronics Group and the MORPHOMODULE™ from Groupe SAGEM are examples of such biometric sensors 140, although other biometric sensors may be used. The fingerprint scanner may also be designed for 1:n fingerprint identification. Optical, capacitive, and other types of fingerprint scanners may be used.

The biometric sensor 140 when coupled with logic to compare the sensed fingerprint to the stored fingerprint should preferably successfully match fingerprints regardless of how the finger is placed on the sensor 140, including smudged prints.

Within PAD P an electronic circuit comprises a processor as well as a memory, for local storage of biometric data of a bearer such as the bearer's fingerprints. The processor may run a software or firmware program for the acquisition and analysis of fingerprints, to compare a fingerprint acquired by the fingerprint scanner 140 and the fingerprint stored in the memory.

The Pad P may also provide an external connector (not shown in FIG. 1) to an external system. The external connector may be a wired connector, such as a Universal Serial Bus (USB), serial, parallel or Firewire port, or a wireless connector for Bluetooth or other wireless communication.

As explained above, the magnetic stripe of the card MC may include a primary protected memory area, typically in track three that contains the authentication key or PIN code, which may be used by the PAD P to recognize the card MC. In one embodiment, the magnetic stripe may also comprise a second protected memory area in which a banking data is stored.

In one embodiment, each time the card MC is engaged with the PAD P, the PAD P verifies the authentication key or PIN code recorded on the magstripe with an authentication key stored in the PAD P for the card MC. In another embodiment, the PAD P may request input of the PIN code from the user.

A card MC in a biometric protection system with the PAD P may be used for transactions in a conventional way, without requiring changes to the magstripe infrastructure. The card MC is typically inserted into or swiped through a transaction terminal in the course of a purchase or other type of transaction. The bearer may be requested to input a PIN code to the terminal in order to validate the transaction. If the PIN code is required and correctly provided, the transaction is validated in a conventional manner. The card MC may then be reinserted in the PAD P to deactivate the card MC by erasing or scrambling the original information in such a way as to prevent any additional transactions with the card. The card MC can then be removed from the PAD P or left engaged with the PAD P as desired.

Once the card is inserted in the slit 100 of PAD P, the PAD P may perform a comparison between an authentication key stored for the card MC in the PAD P and an authentication key recorded in the storage memory of the card. If such verification fails, the PAD P, via the means for display, may indicate to the bearer that the inserted card with magnetic stripe does not match the PAD P.

If the keys match, the PAD P may display a message requesting the bearer to place a finger on the fingerprint sensor 140. PAD P then activates the software used to acquire the fingerprint collected by the sensor 140. Then, via the software, the PAD P performs a comparison between the acquired print and the print stored in memory in the PAD P, using a commercially available matching algorithm. The comparison may be a direct comparison of the input fingerprint from the sensor 140 and the stored fingerprint. In one embodiment, the fingerprints are correlated to a predetermined degree of certainty. If there is a match between the stored fingerprint and the fingerprint it acquired by the scanner, the PAD P may unlock the card MC, by writing the magstripe of the card MC with valid magstripe data for the card MC, previously stored in the PAD P. Although this application describes use of a single fingerprint for this purpose, multiple fingerprints may be used if desired.

If the fingerprint acquired by scanner 140 does not match that stored by the PAD P, the PAD P may indicate an error message on the display and stop the authentication process.

Optionally, the PAD P may be used as a basic calculator to perform simple calculations, using the keypads 120 and 130.

Figure 2:
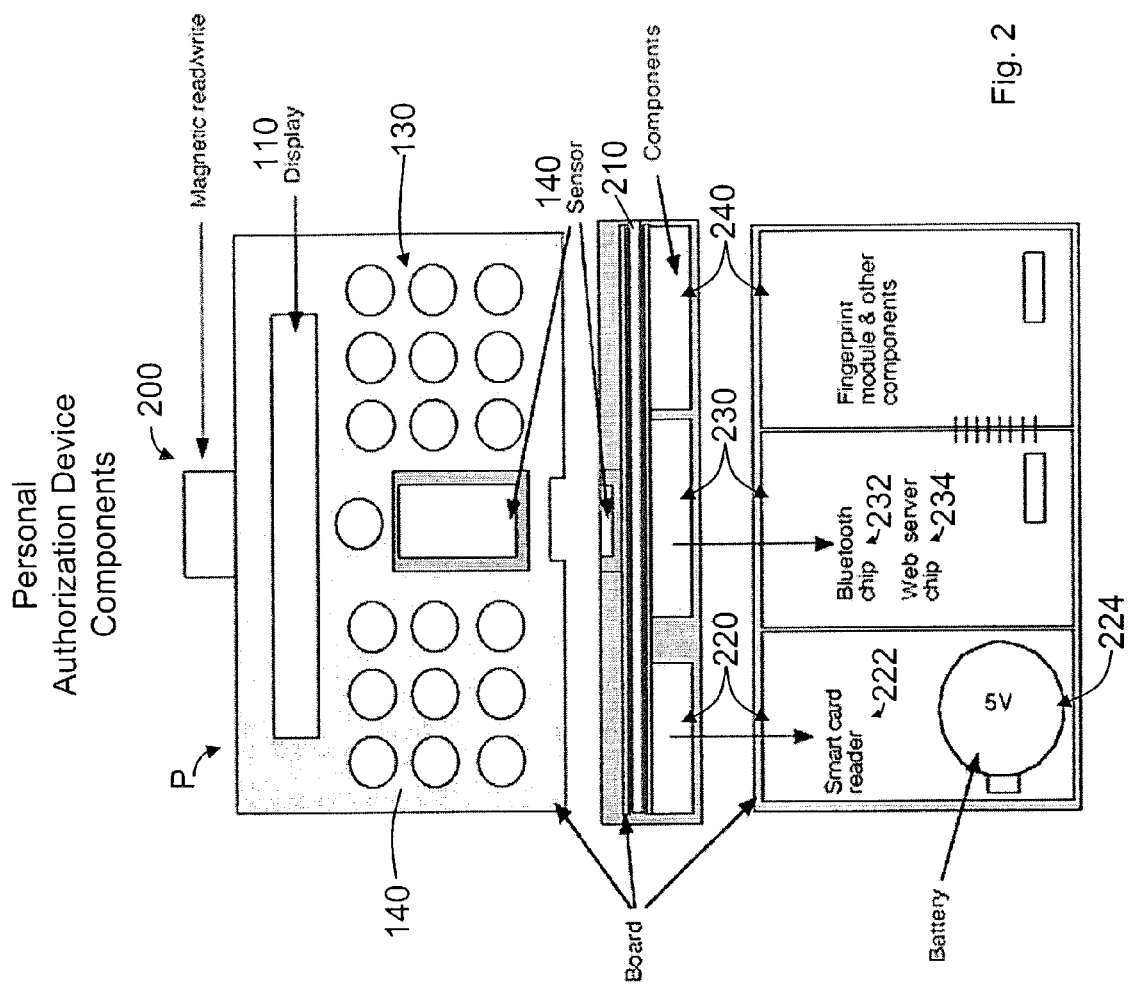
FIG. 2 illustrates three views of another illustrative embodiment of a PAD, showing certain internal components of the PAD.

FIG. 2 illustrates an exploded view of a disclosed embodiment of a PAD P. As shown in FIG. 2, a projection 200 from the body of the PAD P forms a magstripe reader/writer, together with or alternative to the slot 100 shown in FIG. 1. A board 210 provides for mounting the fingerprint sensor 140 and components 220–240 inside the body of the PAD P. As illustrated in FIG. 2, component 220 provides for a smart card reader/writer 222 and a battery 224. Although indicated as a 5V battery 224, other battery types may be used, including rechargeable batteries. In one embodiment, battery 224 has a lifetime of about 12 months and is easy to change. The smart card reader/writer may be either a contact-type or a contactless smart card reader/writer. In the latter case, the smart card may not need to be inserted into the PAD P, but may be read or written when brought into a predetermined proximity of the PAD P. Although the following is expressed in terms of a contact-type smart card, which is typically inserted into the PAD P, the description should be understood to include contactless smart cards which may be engaged with the PAD P without physical insertion into the PAD P. The PAD P typically has no user memory, only systems memory, including memory for storing the biometric data and the account data.

In component 230, a Bluetooth chip 232 may provide for wireless communication using the Bluetooth protocol, thus providing an external connector to the PAD P. As stated above, other types of external connectors, including wired connectors such as a USB connector may be used, with an accompanying physical connection to the PAD P. The PAD P may contain a web server chip 234 for an e-commerce VPN using TCP/IP transactions. Such an embodiment may make the PAD P an electronic payment terminal for internet transactions.

Component 240 includes a fingerprint module and other convenient components, such as a processor and memory (not shown).

Although shown as separate components 220–240, these components may be further integrated onto one or more integrated circuits or further separated into separate modules as convenient or desired for manufacturing or other reasons.

The illustrated embodiment of FIG. 2 is illustrative and exemplary only, and other features and arrangements of features may be used. FIG. 3 illustrates an embodiment in which the PAD P uses separate magstripe and smart card readers 100 and 320. However, a hybrid magstripe and smart card reader/writer may be used, which may include a motorized mechanism for reliability of processing the magstripe.

Figure 7:
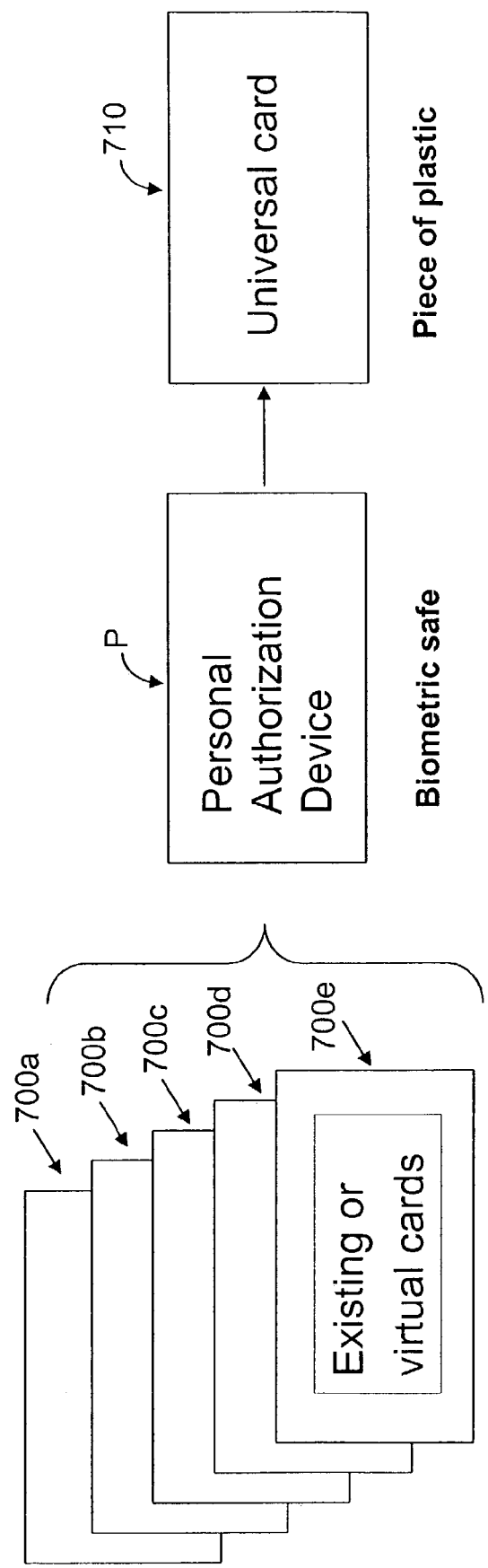
FIG. 7 is a graph illustrating a PAD used for storing multiple portable tokens and creating a universal portable token.

In one embodiment, the PAD P can store a plurality of account data. The stored account data may be for a plurality of magstripe cards. The PAD P can then be used to write the magstripe of the card MC with any one of the plurality of account data. As shown in FIG. 7, a collection of cards 700a–700e can have their account data stored in the PAD P, then the magstripe of a universal magstripe card 710 can be written with the account data corresponding to a selected one of the cards 700a–700e. The cardholder may then store the original cards 700a–700e in a secure location; carrying only the PAD P and the magstripe card 710, which would typically have no embossed information, but may have a signature area 850 for use where signed cards are required for the transaction. The magstripe card 710 can thus substitute as needed for each of the safely stored cards 700a–700e just as if the original card 700a–700e was used. In such an embodiment, the stored account data on the PAD P may include a PIN code or other authentication key in the magstripe data written, for use in automatic teller machines (ATMs) or elsewhere that a PIN is used with the card. Such a universal magstripe card 710 would prevent a thief from obtaining data from the embossed information, which would not be present on the card 710. Further, loss of the card 710 may be handled by simply providing a replacement blank card, because the replacement blank card's magstripe data may be written by the PAD P. A bank or issuer may be able to send replacement or additional account data to the PAD P, so that the issuer may not need to send a physical card to the cardholder.

In one embodiment, multiple people can share a PAD P, storing biometric data for each person on the PAD P, which may be associated with some or all of the stored account data. Thus, for example, person A may be able to use account data for cards 1, 2, and 3 stored in the PAD P while person B may be able to use cards 4, 5, and 6. Additionally, persons A and B may both be able to use the PAD P to enable use of cards. Any combination of people and access to stored account data desired may be provided.

The PAD P may store account data for multiple cards MC as described above. A single PIN code may be associated with one or more of the plurality of account numbers contained in the account data. Thus, one PIN code may be used for any or all of the cards used with the PAD P, or a separate PIN code may be stored for each account number stored on the PAD P.

The PAD P may request engagement of the card MC after or before authorization by comparison of the biometric input of the biometric sensor 140 with the stored biometric data.

Figure 9:
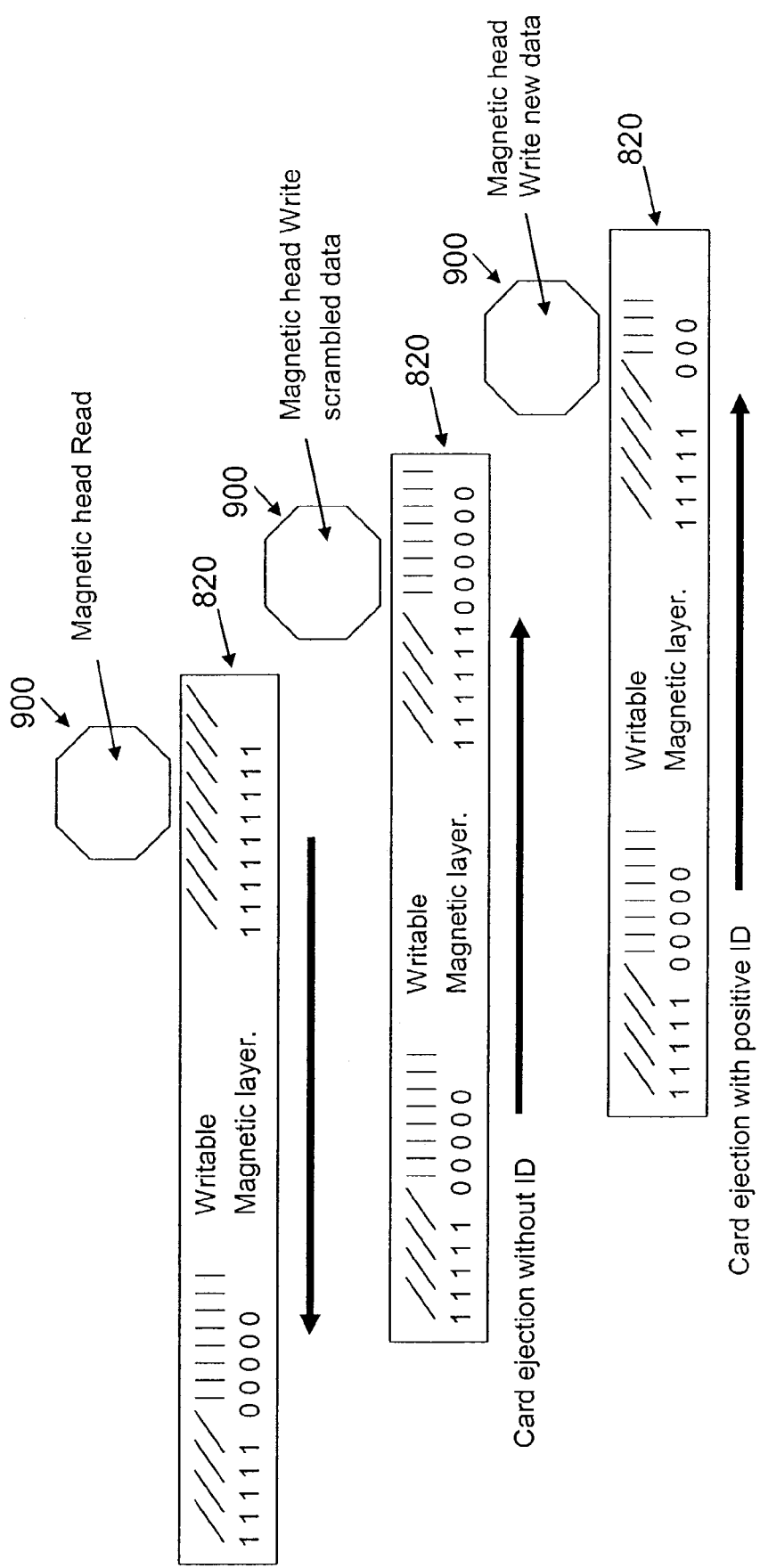
FIG. 9 is a drawing illustrating the effective removal of the portable token from a PAD according to one embodiment.
Figure 10:
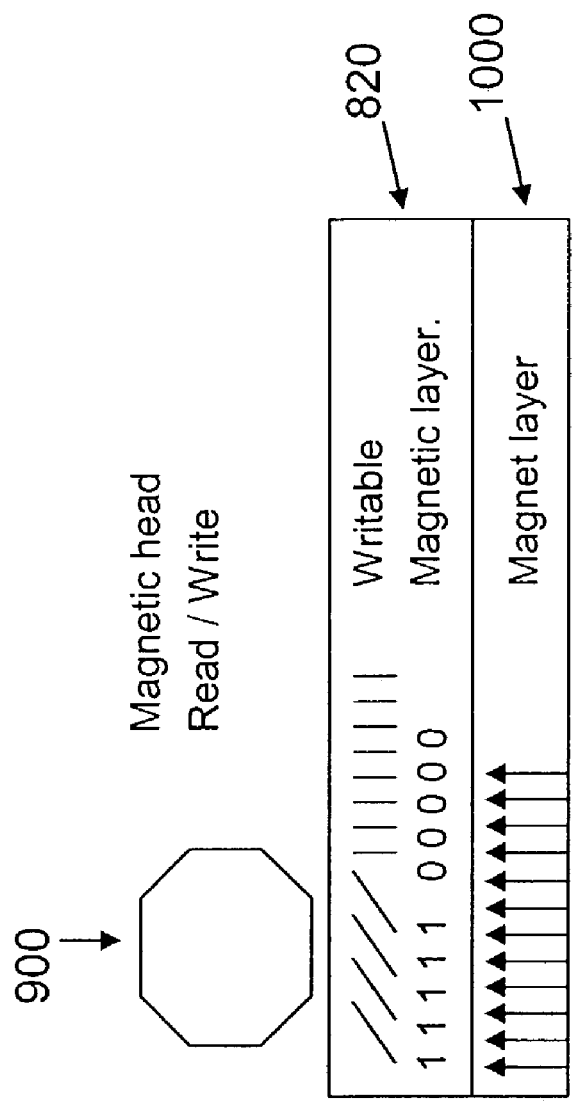
FIG. 10 is a drawing illustrating another embodiment of a magnetic stripe layer for a portable token.

In one embodiment, the PAD P may be designed so that attempts to disassemble the PAD P destroys the stored biometric and/or the stored account data. The PAD P may also be designed so that the magstripe writer writes invalid magstripe data to the card MC upon insertion or swiping of the card MC with the PAD P. The PAD P may also write invalid magstripe data to the card MC when the card MC is ejected or removed from the PAD P without the biometric sensor receiving a biometric input that matches the stored biometric data, as shown in FIG. 9, where a magnetic head of the magstripe reader/writer 200 can read the magstripe 820, then write the magstripe 820 with either invalid or valid data, depending on whether the bearer has been biometrically authorized by the PAD P.

In one embodiment, the user may swipe the card MC or insert the card MC in the PAD P after use to invalidate or disable the card MC by erasing the magstripe 820 or writing invalid magstripe data to the magstripe 820. In another embodiment, the magnetic head 900 may write the magnetic stripe 820 such at a magnetic layer 1000 underneath the magstripe 800 self-invalidates by demagnetizing or scrambling the writable magstripe layer 820 after a predetermined period of time. A magnetic stripe is typically a paint coating containing magnetic field sensitive elements such as ferite. Ferite can be oriented north or south according to the polarity of the magnetic field, thus be used as 0 or 1 for programming bit. Erasing is turning a 1 to 0. If a lower coating layer contains a magnetic substance enabling a very low magnetic field to interfere with the upper coating layer containing the ferite, then the ferite will have a default value of zero after a certain amount of time, thus the magnetic layer "forgets" the data that had been stored in it. To write on such a magnetic layer we have to use a stronger magnetic field than the lower one. The card holding such a layer will be erased by itself after a certain amount of time. This allows the PAD P to write cards MC that "self-destruct" after the predetermined period of time, making use of a stolen card more difficult.

Figure 13:
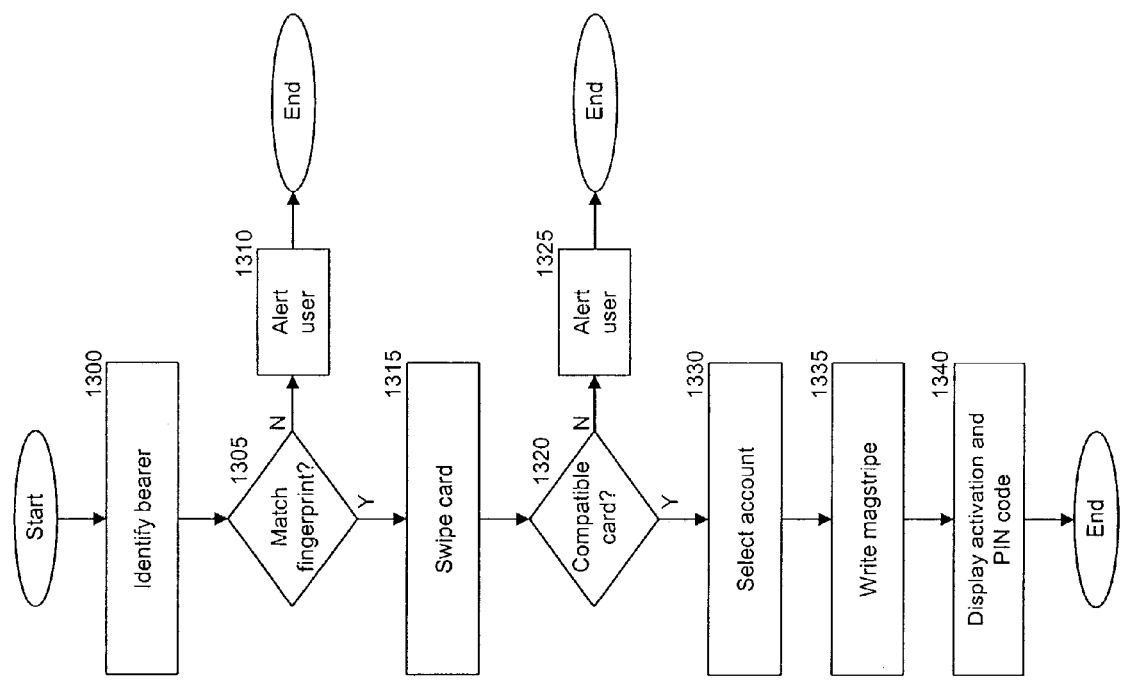
FIG. 13 is a flowchart illustrating a technique for using a PAD with a magstripe card.

FIG. 13 is a flowchart illustrating using the PAD P with the magstripe card MC. To use the card MC with the PAD P, in block 1300 the bearer provides a biometric input to the biometric sensor 140, such as by placing a finger on the sensor 140. Then, in block 1305, the Pad P attempts to match the sensed fingerprint with stored fingerprint data in the PAD P. If no match is found in a predetermined time, typically ten seconds, then in block 1310 the PAD P may display "Invalid fingerprint" in the display 110. Alternately, another visual or audible alert may be used to signal failure of the authentication or authorization of the bearer.

If identification succeeds, then in block 1315 the card MC may be swiped or otherwise engaged with the PAD P to read the magnetic stripe data, if any, on the card MC. In block 1320, the PAD P may determine whether the card MC is compatible with the PAD P. If the magstripe is incompatible with the PAD P, then in block 1325 the display may indicate "Invalid card." Otherwise, the user may then select an account to be used in block 1330, typically by entering a selection on the keypad 120. If only one account is stored, selection block 1330 may be omitted. Then, the card MC may be swiped again to write valid magnetic stripe data to the card MC for the selected account in block 1335 and display "Card activated" in the display 110 in block 1340. If a PIN code is needed to use the card MC, then the PIN code may also be displayed in display 110. The PAD P may be implemented so that a single swipe of the card MC reads then writes the magstripe 820. The PAD P may also be implemented without a magstripe reader, only writing the magstripe as described above. Further, the messages indicated herein are illustrative and exemplary and other messages or forms of alerts may be used. The flowchart is illustrative and exemplary only, and that other actions and ordering of actions may be used.

In one embodiment using a hybrid motorized magnetic stripe and smart card reader, the PAD P may eject the card MC after successful or unsuccessful use with the PAD P. Although the above indicates authorizing the bearer by comparing the biometric input to the stored biometric data prior to checking the compatibility of the card with the PAD P, these actions may take place in either order and other actions may precede, follow, or intervene.

In an embodiment of the PAD P that supports smart cards, such as the card SC shown in FIG. 3, then the PAD P may send a command to read the card SC when the card SC is inserted into the PAD P. A transaction number N may be stored on the smart card and read by the PAD P, typically in an encrypted form that is decrypted by the PAD P after reading. If fingerprint authorization succeeds for the bearer, then the transaction number N may be incremented or decremented and rewritten to the card SC if the resulting value is not a predetermined stop value. Thus, the smart card SC may be enabled by the PAD P for a limited number of transactions, even if the bearer's biometric data matches the stored biometric data. A success or error message may be displayed in the display 110.

Figure 4:
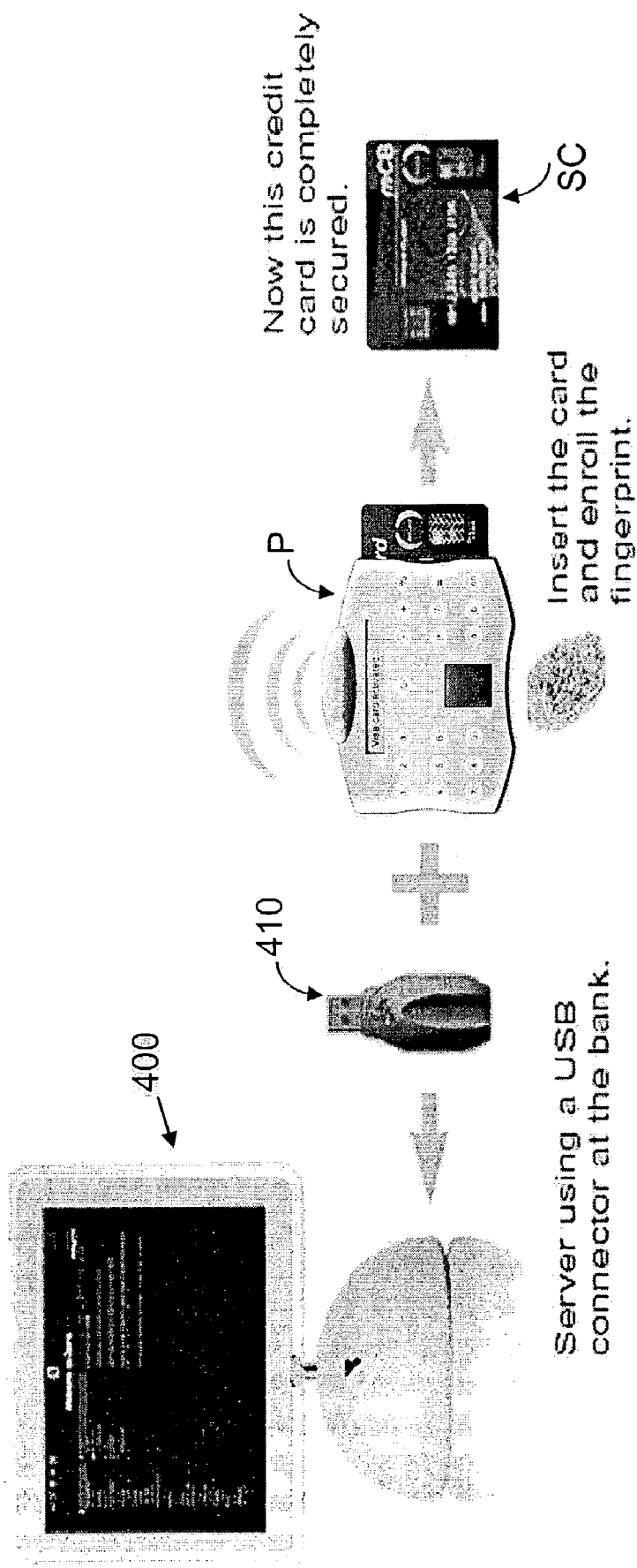
FIG. 4 is an illustration of one embodiment of an enrollment technique for a PAD.
Figure 12:
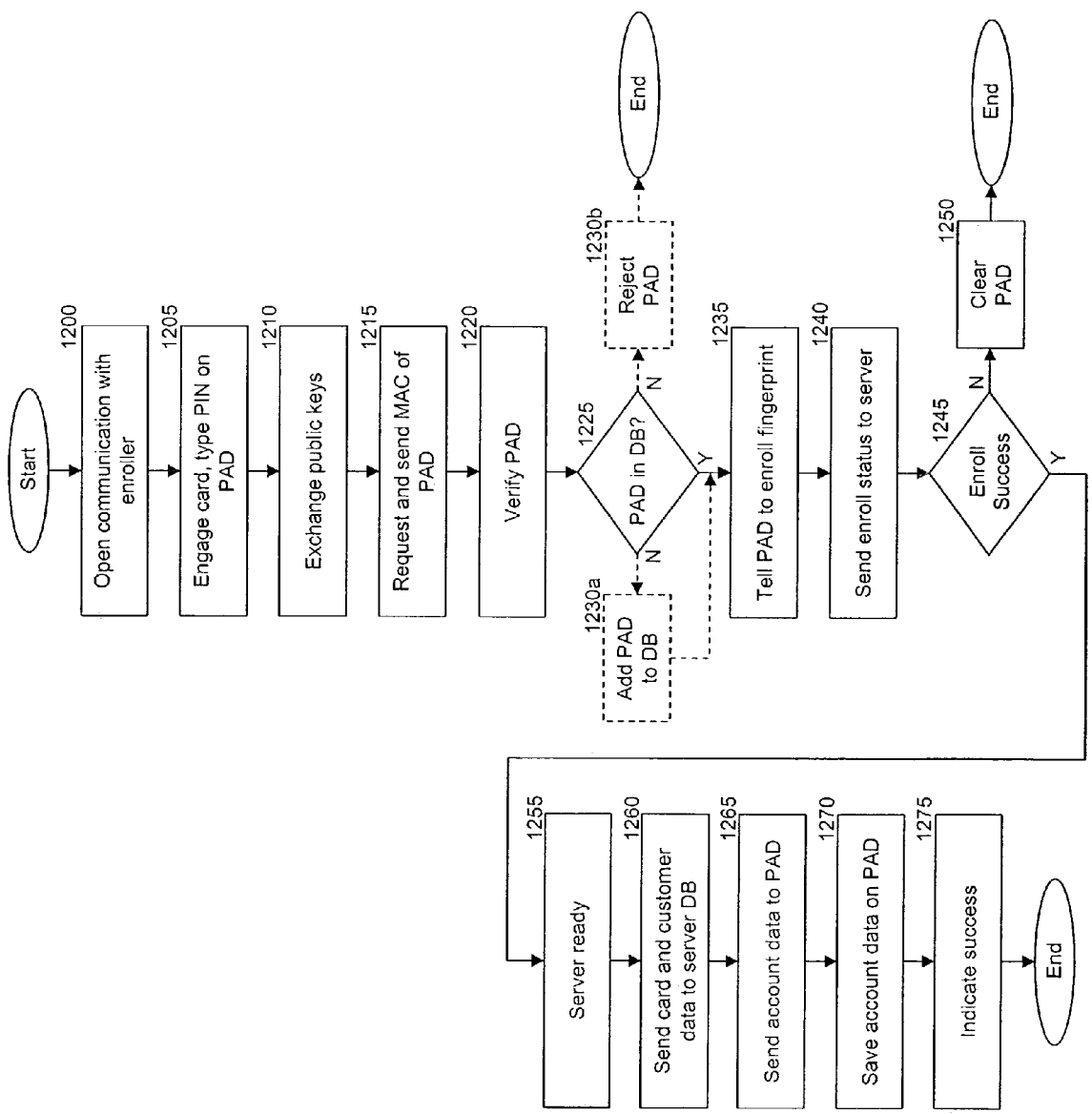
FIG. 12 is a flowchart illustrating an enrollment technique for enrolling a PAD with an enrollment system.

Prior to use, the PAD P and a card MC may be enrolled with an enrollment computer system 400 as shown in FIG. 4 to enable use of the PAD P with the card MC. A similar technique may be used to enroll the PAD P with a smart card SC. The representation of the computer system 400 in FIG. 4 is illustrative only, and any convenient computer system can be used. This enrollment operation will typically be performed at the office of a bank or other card issuer, but may be performed at a third party enrollment service provider. FIG. 12 illustrates certain actions that may occur in a disclosed enrollment technique. The PAD P is connected in block 1200 to the enrollment system 400 via a port 410 of the enrollment system, which is coupled to the external connector of the PAD P, such as the Bluetooth wireless chip 232 or a USB connector such as the USB connector 410 of FIG. 4.

In a typical enrollment, after connecting the PAD P to the enrollment system 400, in block 1205 the bearer may insert a magstripe card MC or a smart card SC into the PAD P, then may enter a PIN code or other authentication key associated with the inserted card on the PAD P, typically using the data entry keypad 120. The enrollment system 400 and the PAD P may use a public key infrastructure technique to encrypt and decrypt communications between them, so the PAD P and the enrollment 400 may each send their public keys to the other in block 1210. Other encryption techniques may be used.

The enrollment system 400 may then in block 1215 request identification from the PAD P, typically requesting the media access control (MAC) address of the PAD P. The PAD P then may send the MAC address to the enrollment system 400. In block 1220 the enrollment system 400 will typically look up the MAC address of the PAD P in a PAD database. As shown in blocks 1225, 1230a, and 1230b, in one embodiment if the PAD P is not contained in the PAD database, then verification fails, and the PAD P will clear its memory and close communications with the enrollment system 400, showing in block 1230b an error message such as "Invalid device" in display 110 of the PAD P. In another embodiment, if the PAD P is not contained in the PAD database of the enrollment system 400, then enrollment system 400 will add the PAD P to the enrollment system database in block 1230a and complete verification.

If verification of the PAD P identity succeeds, then the enrollment system will typically send an enroll command to the PAD P in block 1235. The PAD P may then display a message requesting the bearer to provide the biometric input data by placing a finger on the fingerprint sensor 140. The PAD P may use a message in the display 110 to instruct the bearer to place the finger on the fingerprint sensor 140. If the PAD P succeeds in obtaining a fingerprint, the PAD P will store the fingerprint in the biometric data storage on the PAD P, then send an enrollment status of success or failure to the enrollment system 400 in block 1240. If enroll command fails, in block 1250 the PAD P may stop the enrollment operation, clear its memory, and close communications with the enrollment server, then show a message such as "enrollment failed" on display 110 to indicate the failure to the bearer.

If enrollment succeeds, the enrollment system in block 1255 may indicate to the PAD P that it is ready to receive data from the PAD P. The PAD P may then in block 1260 send information from the inserted card as well as bearer information entered on the keypad 120 to the enrollment system 400. Other information may be supplied as desired by the enrollment system from any useful source. However, the PAD P does not send the biometric data stored in the biometric data storage to the enrollment system 400. The enrollment system 400 may then store the received card and customer data in an enrollment database, which may be a separate database from the PAD database, then send one or more account data to the PAD P in block 1265. In one embodiment, the enrollment system 400 may send a master account number to the PAD P and a list of additional account numbers and/or associated PIN codes to the PAD P. In such an embodiment, the additional account numbers are typically one-time use account numbers, although other limitations on use or no limitations on use of the additional may be used. Other data may be supplied to the PAD P as desired.

The server may then send a message to the PAD P indicating enrollment has succeeded which the PAD P may display on the display 110 in block 1275. The PAD P stores the account data in the account data storage of the PAD P in block 1270. The illustrated actions are illustrative and exemplary, and other actions and ordering of actions may be used.

The enrollment system 400 may be operated by a different entity from the issuer of any or all of the cards enrolled into the PAD P. In a future enrollment transaction, the PAD P may be able to acquire additional account data from either the enrollment system or another issuer or other system. The stored biometric data is typically associated with the master account data if a plurality of account data is provided to the PAD P rather than with the list of account data.

Although generally described above in terms of usage with a magstripe card MC, the PAD P can also be used with a smart card SC, as shown in FIG. 3. In one embodiment, the enrollment technique described above downloads a plurality of one-time use account numbers along with a master account to the PAD P for use with the card MC or the card SC. For each use of the PAD P with either card, a next one of the one-time account numbers is used. In one embodiment, instead of loading a list of one time account numbers, the enrollment system sends an algorithm or algorithms for generating a next one-time account number from the previous account number.

With a smart card, the list of account numbers can be stored on the smart card in its memory. When used outside of the PAD P, only the master account number may be accessible, but when engaged with the PAD P, the additional account numbers are available for use.

When the smart card SC is inserted into the PAD P as in the illustrative flowchart of FIG. 14, block 1400, the PAD P may send a real card command to the smart card SC to read the master account number in block 1410. After performing fingerprint identification as described above in block 1420, the PAD P may verify the master account number obtained from the card SC in block 1440, indicating an invalid card if verification fails. If verification succeeds, in one embodiment in block 1460 the PAD P selects a next account number from the account numbers stored in the PAD P's memory, then in block 1470 writes the account number to the card SC as a master account number. In this embodiment, the card SC may be used in the conventional fashion with the next account number stored by the PAD P.

In another embodiment, the card SC may also contain a list of additional account numbers and supplies the next additional account number to the PAD P from memory on the smart card SC. The PAD P can then store the supplied account number in memory, or flag the selected account number from a synchronized list of additional account numbers stored in the PAD P's memory. The PAD P can then supply the next additional account number via the external connector of the PAD P to a remote system.

In either embodiment, the PAD P may then display a "card activated" message in the display 110 in block 1480, and, if desired, a PIN code associated with the account number, supplied with the account number by the smart card SC or obtained from the account data storage in the PAD P.

In a further embodiment, the smart card may contain an application and processor for encrypting the master account in such a way that it is formatted as a standard account number and is supplied via the PAD P to an external system which can then decrypt the account number, where the encryption technique changes in a way that is synchronized with the external system, so the external system can decrypt using a synchronized decryption technique.

In a disclosed embodiment, after the initial enrollment as described above, additional accounts or account data may be enrolled with the PAD P without requiring a face-to-face enrollment, because the PAD P is already identified to the enrollment system database. In such an embodiment, for example, a user who has exhausted a list of additional account numbers that were one-time use account numbers may obtain additional one-time account numbers from the enrollment system using a remote connection to the enrollment system. In another example, a user who has been issued a new card MC or card SC may have that card associated with the PAD P, loading the account information into the PAD P as in the initial enrollment.

The proposed system provides a mobile, easy-to-operate, cost-efficient solution for secured on-line use of banking cards.

The PAD P, the cardholder and the portable token being tied together for the performance of transactions, on-line fraudulent use of portable tokens may be significantly reduced. No hardware changes are required in the existing magnetic stripe infrastructure, thus there is no requirement for heavy investment by card issuers as would be the case with the adoption of French Smart card technology by the US. Large scale implementation and deployment can be accomplished in a short time.

Further, the PAD P may be used for various financial and non-financial applications, such as the following:

Card activator

E-commerce, e-purse

Personal identification device

External System access control

ID card, Social Security card reader

Electronic safe

Access control device

Figure 11:
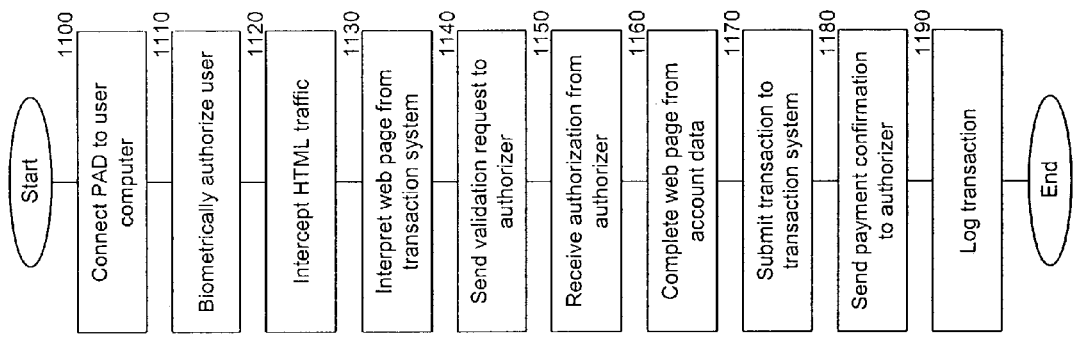
FIG. 11 is a flowchart illustrating a disclosed e-commerce use of one embodiment of a PAD.

In one embodiment, the PAD P may be used for e-commerce as illustrated in the flowchart of FIG. 11, when connected to a network using wireless or wired communications.

Figure 5:
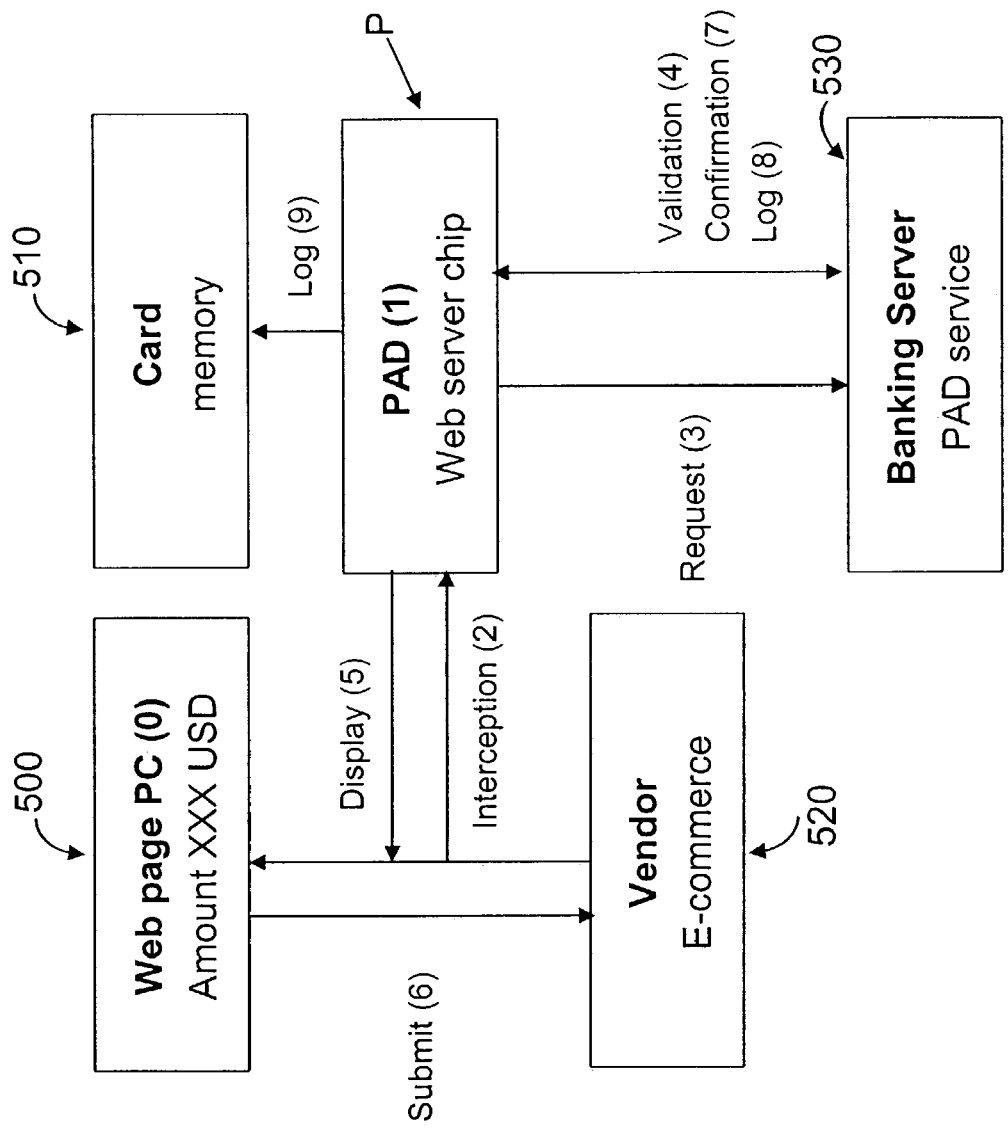
FIG. 5 is a chart illustrating usage of a PAD for authentication of a transaction.

The PAD P can be used with or without a magstripe card MC or a smart card SC. The user connects the PAD P to the user's computer in block 1100 via the external connector, typically a USB wired or Bluetooth wireless connection. Then, the user authenticates himself or herself in block 1110 to the PAD P with a fingerprint or other biometric input, as described above. In one embodiment illustrated in FIG. 5, the web server chip 234 monitors TCP/IP traffic to and from the user's computer, allowing the PAD P to intercept HTML traffic in block 1120 related to a web page 500. If the web server 234 interprets and recognizes HTML for a web page 600 in block 1130 from a transaction system 520 that requests credit card or other payment account data, the PAD P may send a validation request via the web server 234 to a transaction authorization server 530 in block 1140, using a URL stored in the PAD P during the enrollment process supplied by the enrollment server described above or stored in the PAD P prior to delivery to the user. If the transaction authorization server 530 authorizes the transaction, the transaction authorization server may return an authorization code or otherwise pre-authorize the transaction in block 1150. The PAD P may then fill in the web page 500 from account data stored in the PAD P in block 1160, which may be selected by the user if multiple accounts data are stored in the PAD P, and then, in block 1170, either directly submit the transaction back to the transaction system 520, or allow the user to submit the transaction in the conventional way.

In one embodiment, the PAD P does not intercept the HTML or directly submit the transaction to the transaction system 520, but generates a pop-up window for display on the user's computer containing the selected account data. The user may then retype, cut and paste, or otherwise copy the account data to the web page 500, or use the account data in the pop-up window to otherwise provide the account data to the transaction system, such as reading the account data to a vendor representative over a phone line. The transaction system may then submit the transaction for payment in the conventional way, without any knowledge of the use of the PAD P required.

After submitting the account data to the transaction system, the PAD P may additionally send a confirmation of payment to the transaction authorization server 530 in block 1180. The PAD P may also log the transaction in block 1190 in a transaction log of the PAD P.

If a smart card SC is used with the PAD P for the transaction, the account data may be supplied by the smart card SC to the PAD P as described above. Additionally, the PAD P may write transaction log data to the card SC instead of or in addition to logging the transaction on the PAD P transaction log. These actions are illustrative and exemplary only, and other actions or ordering of actions may be used.

In one embodiment, the PAD. P can be used with existing e-purse systems. To pay, read and load e-purse currencies is simple and easy, via Internet and other Bluetooth compliant devices.

In this embodiment, the e-purse application resides on the PAD P instead of a smart card. E-purse is typically a chip-based product. It consists in a software application, included in the chip, which stores monetary value (or a right-to-buy) directly on a payment card. As such an e-purse is close to cash, but is more convenient in the sense that it is a light and clean electronic money that replaces the need to carry change. An e-purse typically also provides additional features: it can hold several currencies and is particularly convenient for traveling abroad. E-purses typically also provide loading foreign currency on then, even when abroad, and to convert a currency already onto the chip into another one for which the bearer may have an immediate need.

Figure 6:
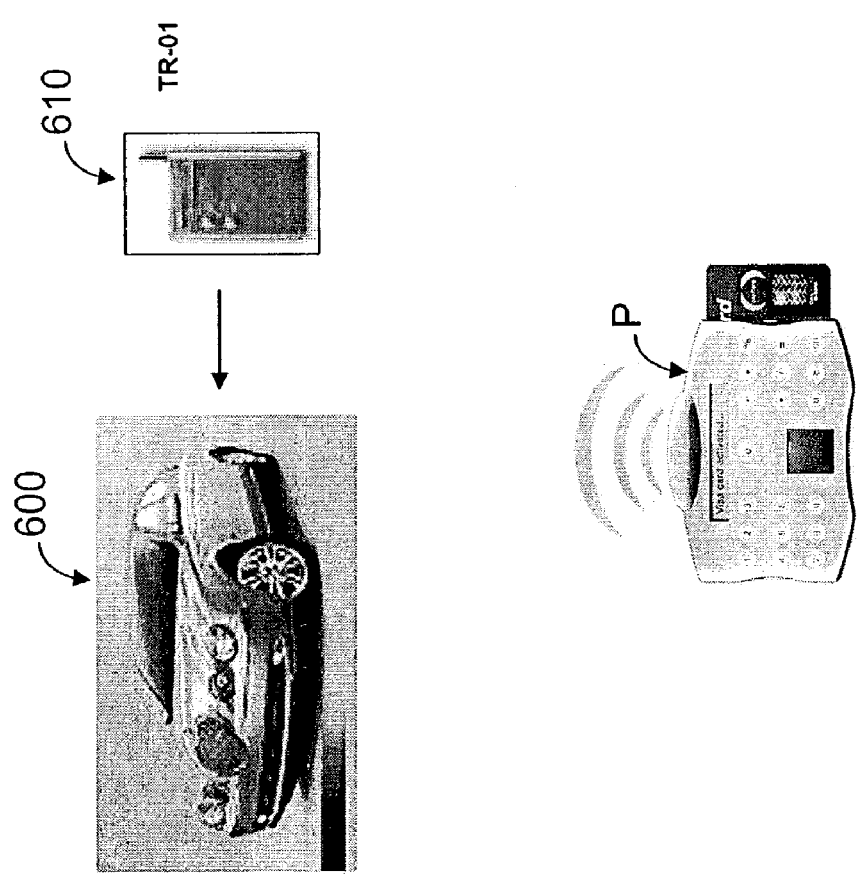
FIG. 6 is an illustration of a PAD used for an access control application.

In another embodiment, the PAD P may be used for access control, such as a car access control. The car manufacturer may, in alternative embodiments, use a Smart card, or interface a TR-01 or other similar access module transceiver 610 with the car access control board as shown in FIG. 6. The transceiver 610 may be connected to the internal vehicle access control board on the car 600. The access may be secured by a PAD P, optionally linked to a Smart card (typically provided by the manufacturer). The user may identify himself or herself on the PAD P. The transaction is recorded and validated. In one embodiment, the PAD P uses wireless communications to communicate with the transceiver 610. When PAD P is in range of the transceiver 610, the car 600 functions normally. When PAD P is out of activation range, the car 600 ceases to function. A simple RS232 interface is required between transceiver 610 and the internal access control board of the car 600.

Although described above in terms of a car 600, the disclosed technique can be used for other kinds of access control embodiments, such as building access control. Instead of, or in addition to transmitting access control account data wirelessly to a transceiver, a wired connection to the PAD P may be used, or the PAD P, when the user is biometrically authenticated, may display a code to be entered by the user in an access control device.

E-commerce can be done with non existent credit card data, meaning the PAD P can create or relay a one time use credit card number and validity date from information either sent by the on-line issuer or created by the PAD P. No permanent valid information need be stored on the card.

The PAD P may use encryption and dynamic keys for transactions. In one embodiment, the emitter and the receiver share the same software, thus allowing shared calculation values. The technique is defined byte following assertion: it is more difficult to decrypt a small ever changing 64 bit algorithm than a 1024 bit fixed algorithm. The software is an algorithm creator, creating 2 keys from 2 initially randomized sources. These 2 keys may then be used as a public and private key to decrypt the message. Inside the message, a new initial key periodically may be randomly created by each source, allowing the software to change the algorithm on the fly and synchronize the two sources for encryption and decryption. Pro-defined chains of algorithm may be defined in tel software to case the periodic change of algorithm. The keys may be generated by sampling of voice or image data or software calculation.

In an e-purse embodiment, the PAD P may provide the ability to read and write to an e-purse enabled card like the French MONEO system. Additionally, the PAD P may allow transfer of e-money from one PAD P to another via Bluetooth wireless or other communications. The transaction may be logged in the PAD P.

In one embodiment, the PAD P can be included or embedded in another device, such as an advanced PDA-like device. One advantage of such an embodiment is that the PDA device typically has a large memory, as well as multiple communication options built in such as Bluetooth, WiFi 802.xx, GSM, and GPRS.

The foregoing has described several exemplary embodiments. Various modifications may be made to the disclosed embodiments without departing from the broader spirit and scope of the invention as set forth in the following claims. The specification and drawings are, accordingly, to be regarded in an illustrative rather than descriptive sense.

We claim:

1. A personal authorization device for authorizing portable tokens for transactions, comprising:
   a sensor adapted to receive a biometric input;
   a biometric data storage adapted to hold stored biometric data to be compared with the biometric input; and
   a magnetic stripe writer, adapted to write valid magnetic stripe data to a magnetic stripe of a portable token responsive to the biometric input corresponding to the stored biometric data;
   a logic adapted for enrollment of the personal authorization device, comprising:
      a personal authorization device identification data;
      logic to receive a portable token identification data from the user;
      logic to send the personal authorization device identification data to an enrollment system; and
      logic to associate the portable token with the biometric input and the portable token identification data.

2. The personal authorization device of claim 1, further comprising:
   an account data storage for storing a plurality of account data,
   wherein the magnetic stripe writer can selectively write one of the plurality of account data to the magnetic stripe.

3. The personal authorization device of claim 2, further comprising:
   wherein the plurality of account data comprises account data corresponding to a plurality of multiple portable tokens,
   wherein the magnetic stripe writer can selectively write account data corresponding to one of a plurality of multiple portable tokens to the magnetic stripe.

4. The personal authorization device of claim 2, each of the plurality of account data comprising:
   an account number; and
   a personal identification number associated with the account number.

5. The personal authorization device of claim 4, the account number comprising:
   an account type field, the account type field indicating whether the account number is a prevalidated account number.

6. The personal authorization device of claim 2, the plurality of account data comprising:
   a plurality of account numbers; and
   an equal plurality of personal identification numbers, each of the plurality of personal identification numbers associated with one of the plurality of account numbers.

7. The personal authorization device of claim 6, wherein each of the plurality of account numbers is valid for only a single use.

8. The personal authorization device of claim 1, further comprising:
   a portable token identification input;
   a stored portable token identification data,
   wherein the magnetic stripe writer writes the magnetic stripe responsive to matching the stored portable token identification data to the portable token identification input.

9. The personal authorization device of claim 1,
   wherein the biometric data storage is further adapted to hold a plurality of stored biometric data, each of the plurality of stored biometric data corresponding to one of a plurality of individuals,
   wherein the magnetic stripe writer is adapted to write valid magnetic stripe data to a magnetic swipe of a portable token responsive to the biometric input corresponding to one of the plurality of stored biometric data.

10. The personal authorization device of claim 1, the magnetic stripe writer further adapted to write invalid magnetic stripe data to the magnetic stripe upon engagement of the portable token with the personal authorization device.

11. The personal authorization device of claim 1, the magnetic stripe writer further adapted to write the magnetic stripe data such that the magnetic stripe data self-invalidates alter a predetermined time.

12. The personal authorization device of claim 1, the biometric sensor comprising a fingerprint sensor.

13. The personal authorization device of claim 1, the biometric sensor comprising a retinal scan sensor.

14. The personal authorization device of claim 1, the biometric input comprising an audio sensor.

15. The personal authorization device of claim 1, wherein the biometric input is directly compared with the stored biometric data.

16. The personal authorization device of claim 1, wherein the biometric input is correlated with the stored biometric data to a predetermined degree of certainty.

17. The personal authorization device of claim 1, further comprising:
   a processor; and
   a firmware for execution by the processor.

18. The personal authorization device of claim 1, further comprising:
   a magnetic stripe reader, adapted to read the magnetic stripe data from the portable token.

19. The personal authorization device of claim 18, wherein the magnetic stripe reader reads the magnetic stripe data prior to the magnetic stripe writer writing the magnetic stripe data.

20. The personal authorization device of claim 1, wherein the portable token is swiped through the personal authorization device for writing the magnetic stripe.

21. The personal authorization device of claim 1, wherein the portable token is inserted into the personal authorization device for writing the magnetic stripe.

22. The personal authorization device of claim 1, wherein the magnetic stripe data comprises:
   a transaction authorization data, the transaction authorization data modified each time the valid magnetic stripe data is written to the magnetic stripe.

23. The personal authorization device of claim 1, the logic to send the personal authorization device identification data to the issuer system using a public key infrastructure encryption.

24. The personal authorization device of claim 1, the personal authorization device identification data comprising a personal authorization device media access control address data.

25. The personal authorization device of claim 1, the enrollment logic further comprising:
logic to receive an account data from the enrollment system via the external connector and associate the account data with the portable taken and the biometric input.

26. The personal authorization device of claim 1, the external connector comprising a wireless transceiver.

27. The personal authorization device of claim 1, the external connector comprising a universal serial bus (USB) connector.

28. The personal authorization device of claim 1, further comprising:
a smart card writer, adapted to write data to a smart card memory valid smart card account data responsive to the biometric input corresponding to the stored biometric data.

29. The personal authorization device of claim 28, further comprising:
a smart card reader, adapted to read a user account data from the smart card memory.

30. The personal authorization device of claim 28, the smart card writer further adapted to modify a transaction counter data in the smart card memory such that the smart card writer disables the smart card if the modified transaction counter data is a predetermined value.

31. An integrated personal authorization device for authorizing transactions, comprising:
a biometric sensor adapted to receive a biometric input;
a biometric data storage adapted to hold stored biometric data to be compared with the biometric input;
an account information storage adapted to hold a plurality of user account data for a plurality of user accounts that correspond to the stored biometric data; and
an interface for authorizing transactions responsive to the biometric input corresponding to the stored biometric data;
a logic adapted for enrollment of the personal authorization device, comprising:
a personal authorization device identification data; and
logic to send the personal authorization device identification data to an enrollment system,
wherein one of the plurality of user account data is selected responsive to the biometric input corresponding to the stored biometric data,
wherein the user account data is encrypted using an encryption technique, and
wherein prevalidated user account data is encrypted using a first encryption technique and non-prevalidated user account data is encrypted using a second encryption technique.

32. The integrated personal authorization device of claim 31, wherein the interface is a wired interface.

33. The integrated personal authorization device of claim 31, wherein the interface is a wireless interface.

34. The integrated personal authorization device of claim 31, wherein the interface is a visual display.

35. The integrated personal authorization device of claim 31, further comprising:
an internal server, adapted to communicate over the interface to a wide area network.

36. The integrated personal authorization device of claim 35, the internal server comprising:
an internal web server.

37. The integrated personal authorization device of claim 35, the internal server adapted to encrypt communications via the interface.

38. The integrated personal authorization device of claim 35, the internal server having an IP address.

39. The integrated personal authorization device of claim 31, the user account data comprising telephone calling card account data.

40. The integrated personal authorization device of claim 31, the user account data comprising credit card account data.

41. The integrated personal authorization device of claim 31, the user account data comprising:
an account number, formed according to a predetermined account number standard; and
a personal identification number corresponding to the account number.

42. The integrated personal authorization device of claim 41, further comprising:
a visual display,
wherein the personal identification number is displayed in the visual display responsive to the biometric input corresponding to the stored biometric data.

43. An integrated personal authorization device for authorizing transactions, comprising:
a biometric sensor adapted to receive a biometric input;
a biometric data storage adapted to hold stored biometric data to be compared with the biometric input;
an account information storage adapted to hold user account information for a user account that corresponds to the stored biometric data; and
an interface for authorizing transactions responsive to the biometric input corresponding to the stored biometric data;
a processor,
a memory coupled to the processor, the memory providing storage for executable instructions adapted to cause the processor to:
communicate with an enrollment system via the interface to enroll the integrated personal authorization device and the portable token with the enrollment system;
send a personal authorization device identification data to the enrollment system via the interface to enroll the integrated personal authorization device with the enrollment system;
receive a plurality of account data from the enrollment system for storage in the account information storage;
select one of the plurality of account data stored in the account information storage responsive to the biometric input corresponding to the stored biometric data; and
transmit a portion of the selected one of a plurality of account data via the interface for a transaction with an external system.

44. The integrated personal authorization device of claim 43, the executable instructions further adapted to cause the processor to:

intercept communications with the external system;
transmit a portion of the selected one of a plurality of account data via the interface to the external system for a first transaction.

45. The integrated personal authorization device of claim 44, the executable instructions further adapted to cause the processor to:
perform a validation transaction with a transaction authorization system via the interface.

46. The integrated personal authorization device of claim 44, the executable instructions further adapted to cause the processor to:
perform a second transaction with a transaction authorization system via the interface, the second transaction comprising information about the first transaction.

47. The integrated personal authorization device of claim 44, the executable instructions further adapted to cause the processor to:
log the first transaction in a transaction storage on the integrated personal authorization device.

48. The integrated personal authorization device of claim 43, the executable instructions further adapted to cause the processor to:
transmit a portion of the selected one of a plurality of account data via the interface to a user computer for display on the user computer.

49. A method of enrolling a personal authorization device, comprising:
opening communications between the personal authorization device and an enrollment system;
authenticating the personal authorization device to the enrollment system, comprising:
sending a personal authorization device identification data to the enrollment system from the personal authorization device;
verifying the personal authorization device identification data by the enrollment system; and
refusing enrollment of the personal authorization device if verification fails,
obtaining biometric data on the personal authorization device from a user;
storing the biometric data on the personal authorization device; and
closing communications with the enrollment system,
wherein the personal authorization device identification data is a media access control (MAC) address for the personal authorization device.

50. The method of claim 49, further comprising:
engaging a portable token with the personal authorization device; and
providing a personal identification code from the user to the personal authorization device associated with the portable token.

51. The method of claim 49, further comprising:
sending a user-supplied data to the enrollment system and sending a portable token data to the enrollment system.

52. A method of enrolling a personal authorization device comprising:
opening communications between the personal authorization device and an enrollment system;
authenticating the personal authorization device to the enrollment system, comprising:
sending a personal authorization device identification data to the enrollment system from the personal authorization device;
verifying the personal authorization device identification data by the enrollment system;
obtaining biometric data on the personal authorization device from a user;
storing the biometric data on the personal authorization device;
closing communications with the enrollment system;
sending a plurality of user account data to the personal authorization device from the enrollment system;
storing the plurality of user account data in the personal authorization device; and
obtaining an additional account data from the enrollment system, comprising:
opening communications between the personal authorization device and the enrollment system;
authenticating the personal authorization device to the enrollment system;
obtaining biometric data on the personal authorization device from a user;
if the biometric input corresponds to the stored biometric data, sending an additional account data to the personal authorization device from the enrollment system.

53. The method of claim 52, each of the plurality of user account data comprising:
a user account code; and
a personal identification code.

54. The method of claim 53, wherein the account code is a one-time use account code.

55. A biometric protection system, comprising:
a personal authorization device, comprising:
a biometric sensor adapted to receive a biometric input;
a biometric data storage adapted to bold stored biometric data to be compared with the biometric input; and
a smart card interface; and
a smart card, adapted to store:
a master account data; and
an application for providing an additional account data to the personal authorization device if the biometric input corresponds to the stored biometric data; and
an enrollment system, comprising:
a processor;
a communications interface, adapted to communicate between the personal authorization device and the enrollment system;
a database coupled to the processor, adapted to store:
a personal authorization device identifier data; and
a user account data; and
an enrollment software, when executed on the processor, causing the processor to perform:
receiving the personal authorization device identifier from the personal authorization device;
locating the personal authorization device in the database, using the personal authorization device identifier; and
validating the personal authorization device, responsive to locating the personal authorization device in the database,
wherein the smart card interface is adapted for communicating with the smart card if the biometric input corresponds to the stored biometric data.

56. The biometric protection system of claim 55, the application adapted to generate the additional account data according to a predetermined algorithm for transmittal to the personal authorization device.

57. The biometric protection system of claim 55, the application adapted to select one of a plurality of user account data for transmittal to the personal authorization device.

58. The biometric protection system of claim 57, wherein the plurality of user account data is created on the smart card by a provider of the smart card.

59. The biometric protection system of claim 57, wherein the plurality of user account data is transmitted front the personal authorization device to the smart card.

60. The biometric protection system of claim 57, the personal authorization device further comprising:

an account data storage adapted to store a copy of the plurality of user account data, wherein upon receipt of the additional account data from the smart card, the corresponding account data is cancelled in the account data storage.

61. The biometric protection system of claim 55, wherein the personal authorization device communicates with the enrollment system to obtain an additional user account data, and wherein the personal authorization device communicates with the smart card to store the additional user account data on the smart card upon validation of the personal authorization device by the enrollment system.

62. The biometric protection system of claim 55, the enrollment software, when executed, further causing the processor to perform:

adding the personal authorization device to the database if the personal authorization device is not located in the database; and validating the personal authorization device responsive to adding the personal authorization device to the database.

63. The biometric protection system of claim 55, validating the personal authorization device comprising:

informing the personal authorization device of success or failure of the validation.

64. The biometric protection system of claim 55, further comprising:

a magnetic stripe writer, adapted to write valid magnetic stripe data to the smart card corresponding to the additional account data.

65. A method of performing e-commerce transactions, comprising:

sending a personal authorization device identification data from a personal authorization device to an enrollment system;

enrolling the personal authorization device responsive to receipt by the enrollment system of the personal authorization device identification data storing a biometric data on the personal authorization device responsive to enrolling the personal authorization device;

comparing a biometric input on the personal authorization device to the stored biometric data, engaging a portable token with the personal authorization device, the portable token containing a user account data;

providing the user account data via the personal authorization device for use by a transaction system, responsive to the stored biometric data corresponding to the biometric input.

66. The method of claim 65, further comprising:

communicating between the personal authorization device and a transaction authorization system independent of the transaction system, responsive to the stored biometric data corresponding to the biometric input;

validating the personal authorization device on the transaction authorization system; and validating the user account data on the transaction authorization system.

67. The method of claim 66, further comprising:

receiving a validation information from the transaction authorization system; and transmitting the validation information to the transaction system.

68. The method of claim 66, wherein the user account data is a one-time use user account data.

69. The method of claim 65, wherein the user account data is displayed on a user computer in a pop-up window, and wherein the user copies the user account data to the transaction system.

70. The method of claim 65, wherein the user account data is transmitted by the personal authorization device to the transaction system.

* * * * *